(12) United States Patent
Kawabata et al.

(10) Patent No.: US 7,369,459 B2
(45) Date of Patent: May 6, 2008

(54) FORWARD-LOOKING SONAR AND UNDERWATER IMAGE DISPLAY SYSTEM

(75) Inventors: Yasuo Kawabata, Nishinomiya (JP); Tokihiko Hamada, Nishinomiya (JP); Hidetoshi Kaida, Nishinomiya (JP)

(73) Assignee: Furuno Electric Company, Limited, Hyogo-Ken (JP)

( * ) Notice: Subject to any disclaimer, the term of this patent is extended or adjusted under 35 U.S.C. 154(b) by 187 days.

(21) Appl. No.: 11/199,162

(22) Filed: Aug. 9, 2005

(65) Prior Publication Data

US 2007/0291589 A1    Dec. 20, 2007

(30) Foreign Application Priority Data

Aug. 10, 2004    (JP)    ............... 2004-233447

(51) Int. Cl.
*G01S 15/42*    (2006.01)
(52) U.S. Cl. ...................................... 367/88
(58) Field of Classification Search .................. 367/88
See application file for complete search history.

(56) References Cited

U.S. PATENT DOCUMENTS 5,530,680 A     6/1996  Whitehurst
5,675,552 A    10/1997  Hicks et al.
2005/0007881 A1 *  1/2005  Zimmerman et al. ........ 367/103

FOREIGN PATENT DOCUMENTS

| GB | 2417081 A | * | 2/2006 |
| JP | 2-88984 A | | 3/1990 |
| JP | 2001-311770 A | | 11/2001 |
| JP | 2001311770 A | * | 11/2001 |

* cited by examiner

*Primary Examiner*—Dan Pihulic
(74) *Attorney, Agent, or Firm*—Birch, Stewart, Kolasch & Birch, LLP

(57) ABSTRACT

A forward-looking sonar includes a transducer array which is divided into a first sub array and a second sub array, a first beamforming section for forming a first receiving beam with the first sub array, and a second beamforming section for forming a second receiving beam with the second sub array. The forward-looking sonar receives target echoes from a wide sounding area with these receiving beams. The forward-looking sonar further includes a position measurement section for determining the position of a target based on the direction of the target calculated from a phase difference between the echoes from the target received by the first and second receiving beams by a split-beam method and the distance to the target calculated from time needed for receiving the echoes after transmission.

9 Claims, 32 Drawing Sheets

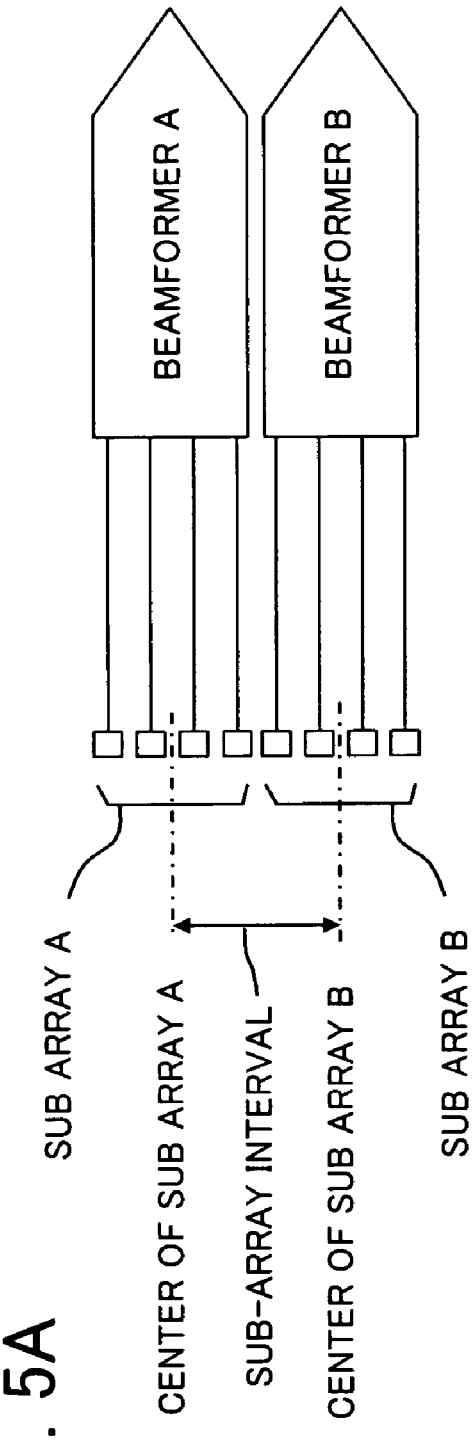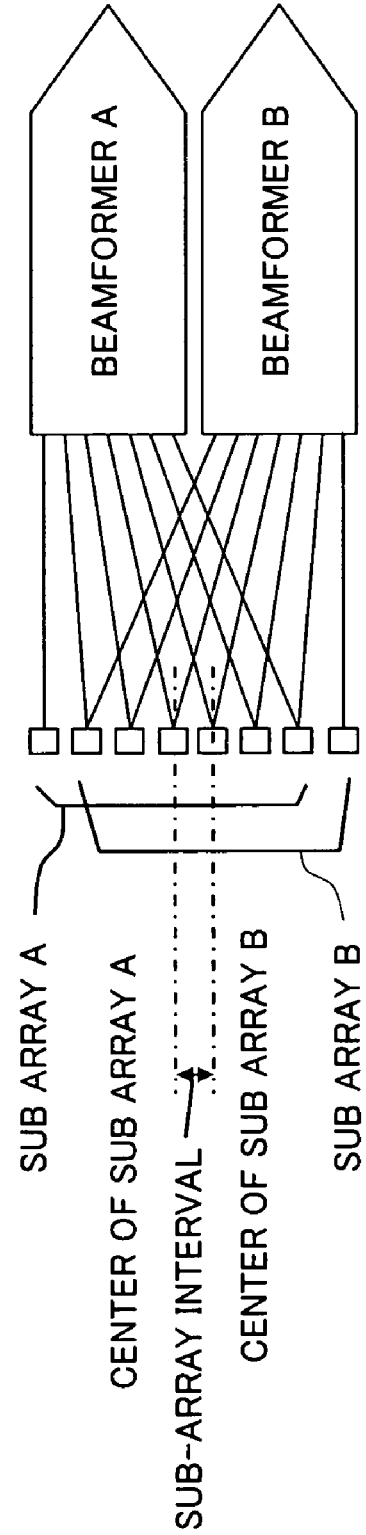

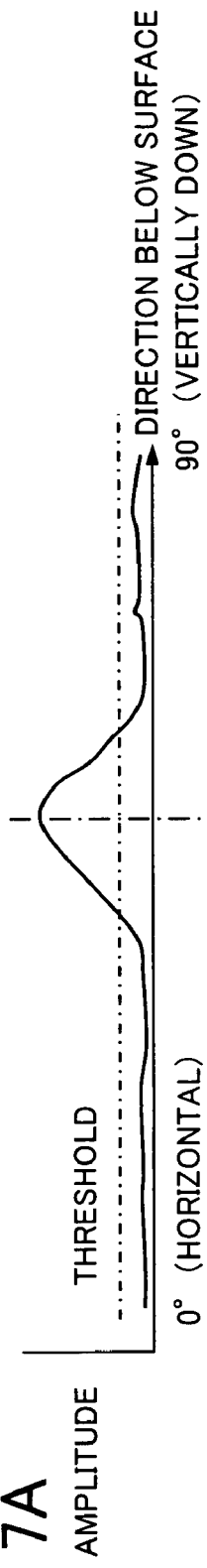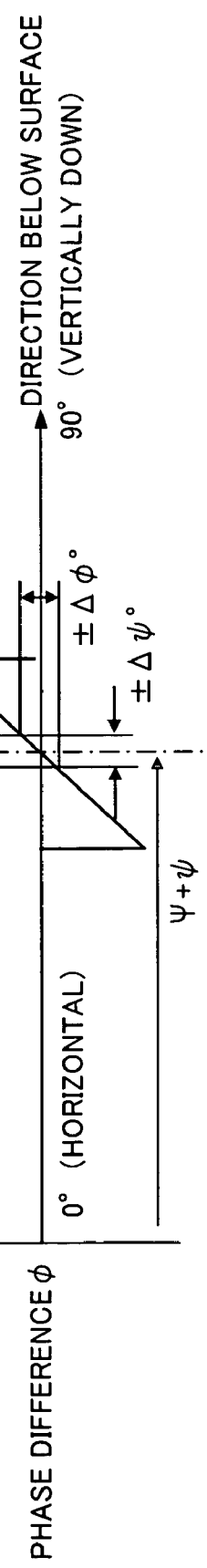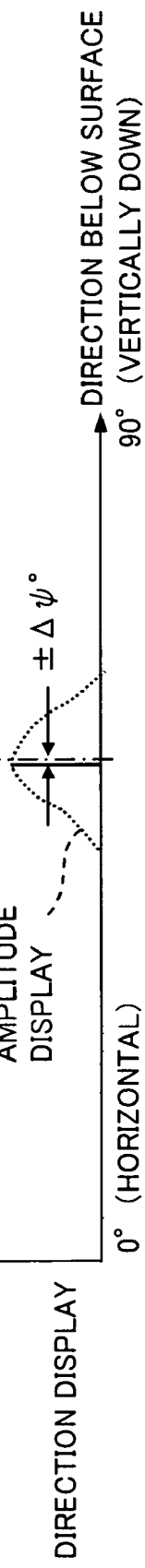

EXAMPLE OF ON-
SCREEN IMAGE
OBTAINED WITH
AMPLITUDE
INFORMATION ALONE

EXAMPLE OF ON-SCREEN
IMAGE OBTAINED BY SPLIT-
BEAM METHOD

CONVENTIONAL SOUNDING
TECHNIQUE
(ECHOES FROM TWO POINTS P, Q
ARRIVE AT THE SAME TIME CAN
NOT BE DISTINGUISHED.)

SPLIT-BEAM METHOD OF
INVENTION
(MULTIPLE BEAMS ARE FORMED
ACROSS SOUNDING AREA..)

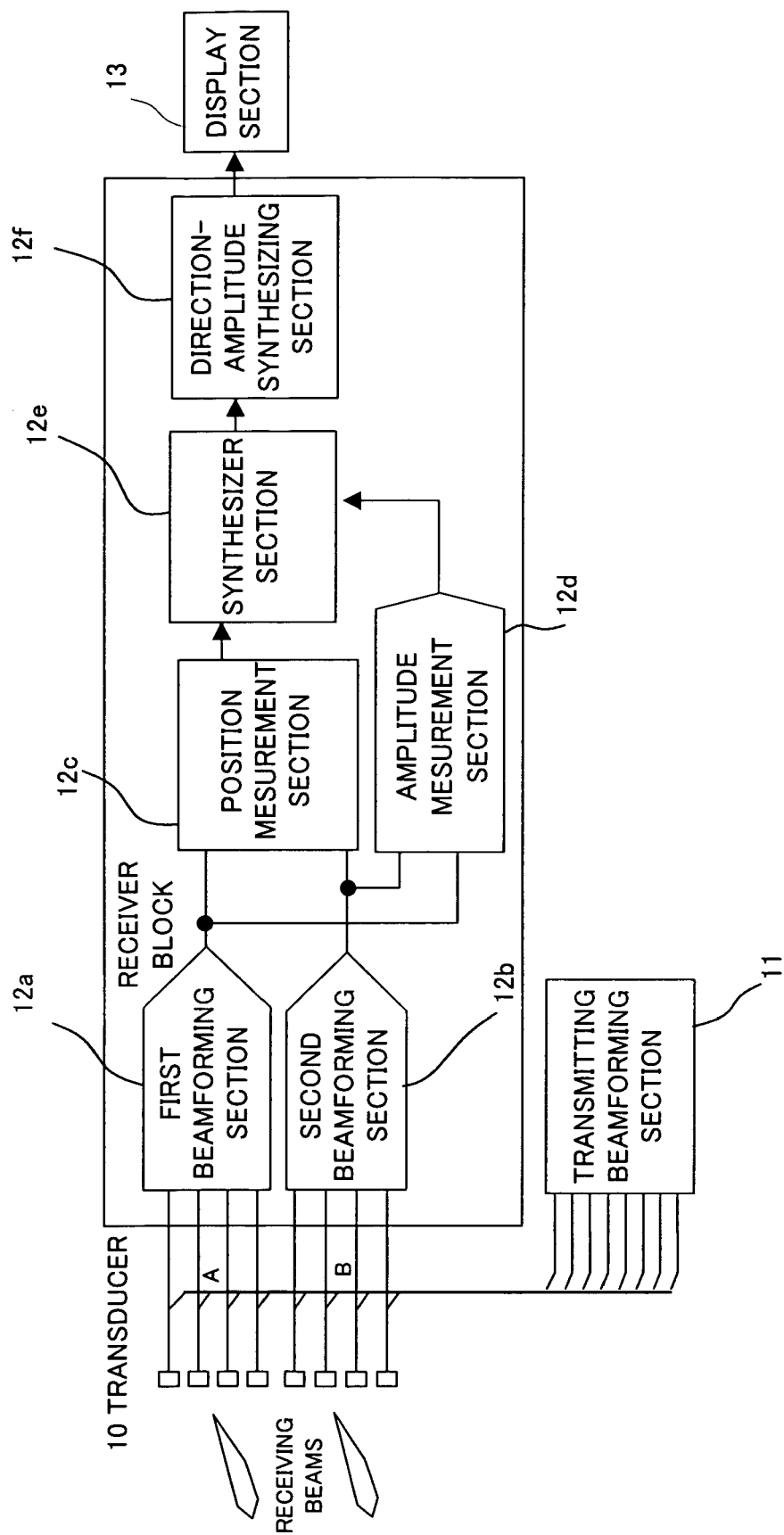

BEAM ANGLE: NARROW

BEAM ANGLE: WIDE (ECHOES FROM MULTIPLE POINTS WITHIN TARGET AREA ARRIVE AT THE SAME TIME.)

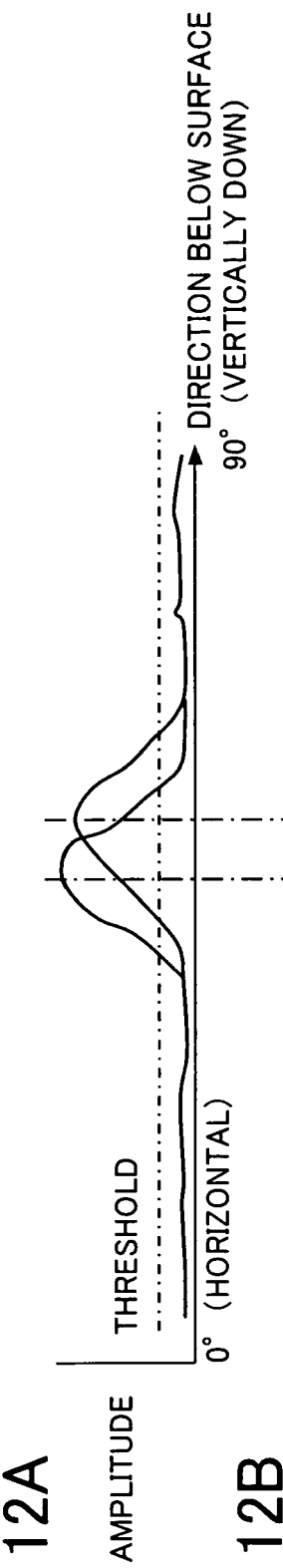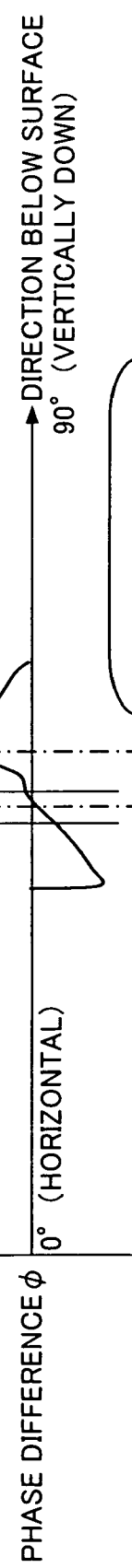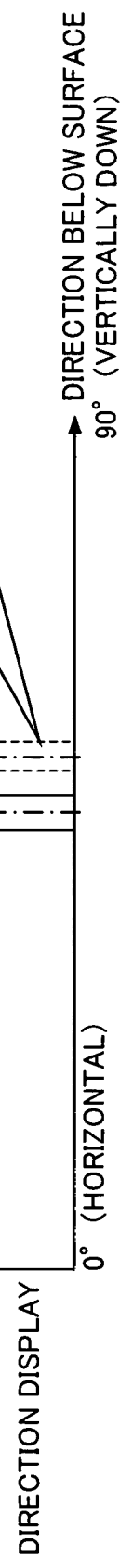

AMPLITUDE DISPLAY BY
CONVENTIONAL BEAMFORMING
METHOD

ON-SCREEN DISPLAY BY
SPLIT-BEAM METHOD

CENTER OF GRAVITY IN "A" DIRECTION

AMPLITUDE DISPLAY OF FLAT SEA BOTTOM

CENTER OF GRAVITY DISPLAY
(BOTTOM IS SHOWN SHALLOWER WITH RANGE.)

CENTER OF GRAVITY IN "B" DIRECTION

FIG. 17
ON-SCREEN PICTURE
BY AMPLITUDE DISPLAY ONLY
ON-SCREEN PICTURE BY
SPLIT-BEAM METHOD
(BEFORE SYNTHESIS)
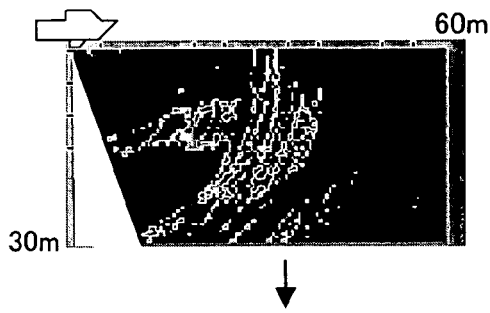
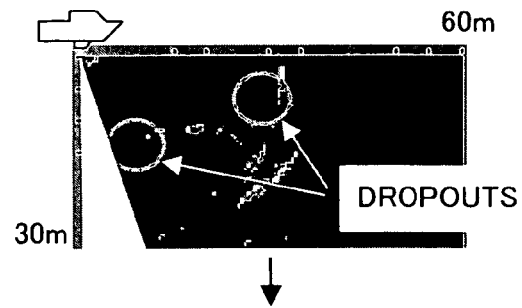
↓
CENTER OF GRAVITY
IN EACH DIRECTION SHOWN
IN AMPLITUDE DISPLAY
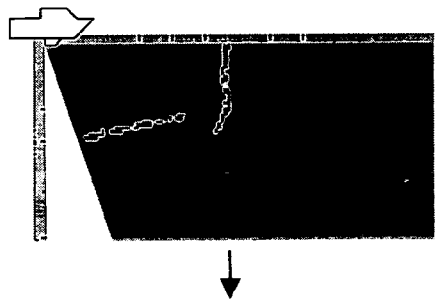 SYNTHESIS → 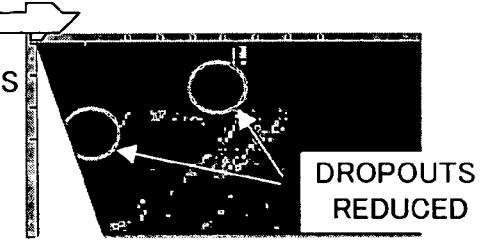
↓
CENTERS OF GRAVITY
IN SMALL VARIANCE AREA
ONLY ARE EXTRACTED
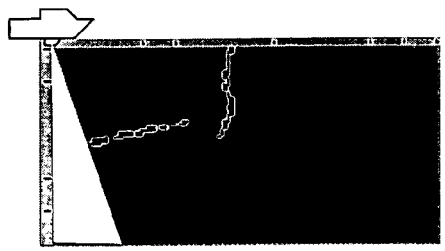 SYNTHESIS → 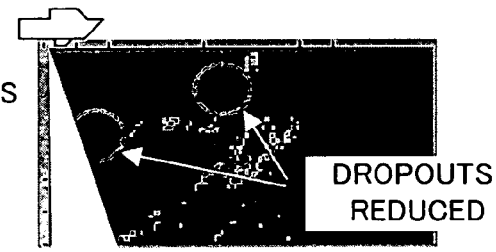

ON-SCREEN DISPLAY BY SPLIT-
BEAM METHOD (Phase difference
range = ±10° )

ON-SCREEN DISPLAY BY SPLIT-
BEAM METHOD (Phase difference
range = -10° to 120° )

TRANSMISSION    RECEPTION

PRINCIPLE OF SPLIT-BEAM METHOD

BOTTOM ECHO ENLARGES WITH RANGE

FORWARD-LOOKING SONAR AND UNDERWATER IMAGE DISPLAY SYSTEM

BACKGROUND OF THE INVENTION

1. Field of the Invention

The present invention relates to a forward-looking sonar for displaying echoes of objects ahead of a surface vessel by use of transmitted and reflected ultrasonic waves (hereinafter referred to as acoustic waves). More particularly, the invention pertains to a forward-looking sonar capable of measuring and visually presenting the distance and direction of any of such navigational hazards as shallows and underwater obstacles ahead of a surface vessel.

2. Description of the Related Art

A forward-looking sonar for measuring and visually presenting the distance and direction of any of such navigational hazards as shallows, reefs, drifting surface objects, underwater obstacles and a sea bottom ahead of a surface vessel is installed as shown in FIG. 27. A transducer of the forward-looking sonar is typically installed on the hull of the vessel as illustrated. By using an acoustic sounding beam formed by the transducer, the forward-looking sonar searches for any of the aforementioned underwater obstacles present within a fan-shaped sounding area from the surface of the sea to the bottom (90 degrees downward from the surface).

There exist conventionally known examples of this kind of forward-looking sonars.

For example, U.S. Pat. No. 5,675,552 discloses a sonar apparatus using a phased array technique including a transducer for transmitting and receiving acoustic waves, the transducer having multiple elements which are arranged in line to constitute a linear array. Phase differences among transmit signals fed into the individual transducer elements and phase differences among receive signals obtained by the individual transducer elements are so controlled as to successively steer an acoustic transmitting/receiving beam from the surface to the bottom over a 90-degree sector area to determine the direction of a return echo from an underwater object. The sonar apparatus determines the distance to the object based on time needed for receiving the return echo after transmission. FIG. 28 is a diagram showing how the acoustic transmitting/receiving beam formed by the linear array transducer is successively steered.

U.S. Pat. No. 5,530,680 gives another prior art example. An echo sounding apparatus described in this U.S. patent includes a transducer for transmitting and receiving acoustic waves, the transducer having multiple elements which are arranged in line to constitute a linear array. The echo sounding apparatus determines the direction of a return echo from an underwater object by a split-beam method and the distance to the object based on time needed for receiving the return echo after transmission.

According to the method of U.S. Pat. No. 5,530,680, the echo sounding apparatus transmits the acoustic waves in a 90-degree sector area by one transmission from a single element and receives return echoes from an underwater object by using two paired elements as illustrated in FIG. 29. The echo sounding apparatus determines the direction of the object from a phase difference between the echoes received by the paired elements and the distance to the object based on time needed for receiving the echoes from the object after transmission.

The aforementioned split-beam method is a method of determining the direction of a target from a phase difference between echoes from the target detected by two receiving beams directed toward the target. Referring to FIG. 30, if echoes from a target are received by two elements R, L from a direction θ, a phase difference φ between the echoes received by the two elements R, L varies with the direction of the target, so that it is possible to know the direction of the target from the phase difference φ. Given a wavelength λ of the acoustic waves and an element-to-element distance d, the phase difference φ is calculated by equation (1) below:

$$\phi = \frac{2\pi d}{\lambda} \cdot \sin\theta \text{ (rad)} \tag{1}$$

From equation (1) above, the direction θ is obtained by equation (2) below within beam angles of the individual elements R, L:

$$\theta = \sin^{-1}\frac{\phi\lambda}{2\pi d} \tag{2}$$

Equation (2) above indicates that the direction θ of the target is linearly related to the phase difference φ as shown in FIG. 31. Since the wavelength λ and the element-to-element distance d have fixed values, the accuracy of the direction θ obtained by equation (2) is determined by measuring accuracy of the phase difference φ.

The aforementioned prior art arrangements however have their respective drawbacks.

Specifically, one drawback of the arrangement of U.S. Pat. No. 5,675,552 is that the sonar apparatus requires considerable time for searching for obstacles. Since the transducer transmits acoustic waves and receives return echoes in one direction to another in a step-by-step sequence, it normally takes a good deal of time to obtain an underwater cross-sectional image within a 90-degree fan-shaped search area ahead of a vessel. If the 90-degree area is to be searched by successively steering the transmitting/receiving beam in 3-degree steps, for example, it would be necessary to repeatedly perform transmit/receive cycles 30 times.

Another drawback of the arrangement of U.S. Pat. No. 5,675,552 is poor direction measuring accuracy. The sonar apparatus displays echoes detected within a beam angle of the transmitting/receiving beam and, therefore, the direction measuring accuracy is determined by the beam angle. Particularly when the sonar apparatus is operated on a larger range scale for detecting obstacles at greater distances, a bottom echo displayed on-screen becomes larger (displayed over a longer range) as shown in FIG. 32, so that a range at which targets can be distinguished from the bottom is limited on larger range scales. Although this drawback can be more or less overcome by reducing the beam angle of the transducer, it is generally necessary to increase array length by using a larger number of elements to constitute a longer linear array transducer. This approach results in an increase in physical size and manufacturing cost of the transducer, also imposing a problem related to transducer installation.

The aforementioned arrangement of U.S. Pat. No. 5,530,680 has a drawback in that the echo sounding apparatus has a limited sounding range. Since the echo sounding apparatus transmits acoustic waves in the 90-degree sector area by using a single element, transmitting sound pressure (or source level) is low. Sensitivity to return echoes is also low and the sounding range is limited since the return echoes are received by each of the two paired elements alone.

Another drawback of the arrangement of U.S. Pat. No. 5,530,680 is losses, or dropouts, of return echo data. In the split-beam method used in the arrangement of U.S. Pat. No. 5,530,680, the echo sounding apparatus can not distinguish echoes from two or more equidistant targets located in different directions (just like echoes from equidistant points P and Q shown in FIG. 9A which will be later described) as these echoes arrive at the same time. This causes a problem of echo data dropout.

SUMMARY OF THE INVENTION

In light of the foregoing, it is an object of the invention to provide a forward-looking sonar which can search through a wide sounding area by using a transducer array formed by a relatively small number of elements without causing a problem of return echo dropout even when multiple echoes arrive at the same time.

According to the invention, a forward-looking sonar includes a transducer array formed of a plurality of transducer elements arranged in line, the transducer array being divided into a first sub array and a second sub array, beamformers for forming a first receiving beam with the first sub array and a second receiving beam with the second sub array within a sounding area, and a position measurement section for determining the position of a target based on the direction of the target calculated from a phase difference between echoes from the target received by the first and second receiving beams within the sounding area and the distance to the target calculated from time needed for receiving the echoes after transmission.

The forward-looking sonar of the invention forms two receiving beams within a sounding area as stated above. For example, the forward-looking sonar steers the two receiving beams within a fan-shaped sounding area and picks up echoes returning from targets within this sounding area by using the two receiving beams. Then, the forward-looking sonar determines the direction of each target by a split-beam method. Alternatively, the forward-looking sonar may form a large number of receiving beams oriented in different directions within the sounding area and determine the direction of each target by the split-beam method by using two of the receiving beams.

The forward-looking sonar determines the position of each target based on the direction of the target calculated from a phase difference between echoes from the target received by the two receiving beams within the sounding area and the distance to the target calculated from the time needed for receiving the echoes after transmission.

In one feature of the invention, the forward-looking sonar may be such that the position measurement section determines the position of the target based on the direction of the target determined as being approximately at the middle of the beam angle of the individual receiving beams when echoes from the target are received by the receiving beams within the sounding area and the distance to the target calculated from the phase difference between the echoes from the target picked up by the individual receiving beams.

The forward-looking sonar plots the position of each target on a two-dimensional display screen when necessary.

While the earlier-described conventional forward-looking sonar uses a fixed directional beam formed by a single transducer element, the forward-looking sonar of the invention can scan a wide sounding area at a time. Additionally, the forward-looking sonar of the invention forms the two receiving beams each having a narrow beam angle. Thus, the forward-looking sonar of the invention can distinguish echoes from two or more equidistant targets located in different directions, thereby producing an advantage that the number of echoes received at the same time decreases and echo signal dropouts occur less frequently.

In another feature of the invention, the forward-looking sonar further includes a synthesizing section for forming a main beam by adding the first and second receiving beams, calculating the center of gravity or a maximal value of echo signal intensities of an echo detected by the main beam along a range direction in each main beam direction, determining the position of the target from the direction of the main beam and the center of gravity or the maximal value of the echo signal intensities, and synthesizing the position of the target thus determined with the position of the target determined by the position measurement section.

Even when echo signal dropouts occur, the forward-looking sonar thus structured can fill the echo signal dropouts with amplitude information.

Preferably, the synthesizing section calculates the variance of the echo signal intensities along the range direction in each main beam direction, and synthesizes the position of the target determined by the synthesizing section from the direction of the main beam and the center of gravity or the maximal value of the echo signal intensities with the position of the target calculated by the position measurement section only when the variance of the echo signal intensities is equal to or lower than a specific threshold.

In a target area, such as a flat sea bottom at a far range, where the sounding beam hits the target area at an oblique angle, echo signal intensity (amplitude) gradually decreases with an increase in distance. As a result, the center of gravity or the maximal value of the echo signal intensities deviates from a true echo position (toward a near side in a practical situation), so that a false image is displayed if the position of the target determined from the center of gravity or the maximal value of the echo signal intensities is synthesized with the position of the target calculated by the position measurement means. Under such circumstances, the synthesizing section calculates the variance of echo signal intensities (amplitudes) along the range direction in each main beam direction and synthesizes the position of the target determined by the synthesizing section from the direction of the main beam and the center of gravity or the maximal value of the echo signal intensities with the position of the target calculated by the position measurement section only when the variance of the echo signal intensities is equal to or lower than the specific threshold, or only when the echo signal intensity (amplitude) does not gradually decrease with distance.

Instead of the aforementioned configuration, the forward-looking sonar may be structured such that the synthesizing section calculates the center of gravity or a maximal value of echo signal intensities of an echo detected by the main beam along a beam steering direction at each distance, determines the position of the target from the distance to the target and the center of gravity or the maximal value of the echo signal intensities, and synthesizes the position of the target thus determined with the position of the target determined by the position measurement section.

Furthermore, instead of including the aforementioned synthesizing section, the forward-looking sonar may be structured such that the position measurement section expands the width of the direction of an echo determined based on the phase difference.

According to the invention, the forward-looking sonar can simultaneously scan a wide sounding area and reduce the number of echo signal dropouts due to echoes arriving at the same time.

These and other objects, features and advantages of the invention will become more apparent upon reading the following detailed description along with the accompanying drawings.

BRIEF DESCRIPTION OF THE DRAWINGS

FIGS. 5A and 5B are diagrams showing two kinds of receiving beamforming method;

FIGS. 7A, 7B and 7C are diagrams showing a relationship between phase difference and target direction;

FIG. 10 is a block diagram of a forward-looking sonar according to a second embodiment of the invention;

FIGS. 12A, 12B and 12C are diagrams showing echo signals received at the same time;

FIG. 17 shows examples of on-screen pictures including pictures obtained by performing synthesis (interpolation) operation on images with echo signal dropouts produced from echoes from a quay and the sea bottom immediately below;

DETAILED DESCRIPTION OF THE PREFERRED EMBODIMENTS OF THE INVENTION

First Embodiment

Figure 1:
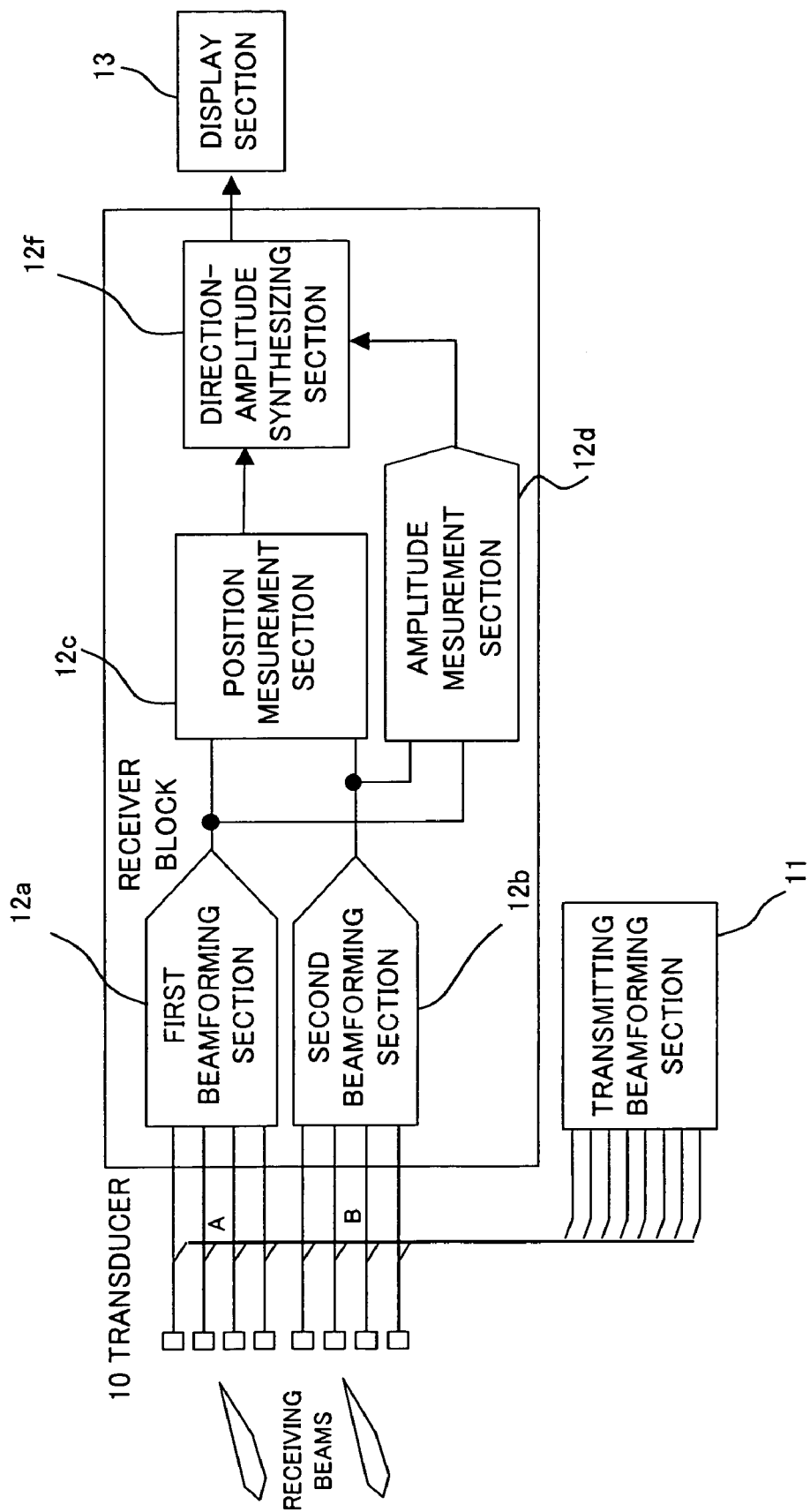
FIG. 1 is a block diagram of a forward-looking sonar according to a first embodiment of the invention.
Figure 2:
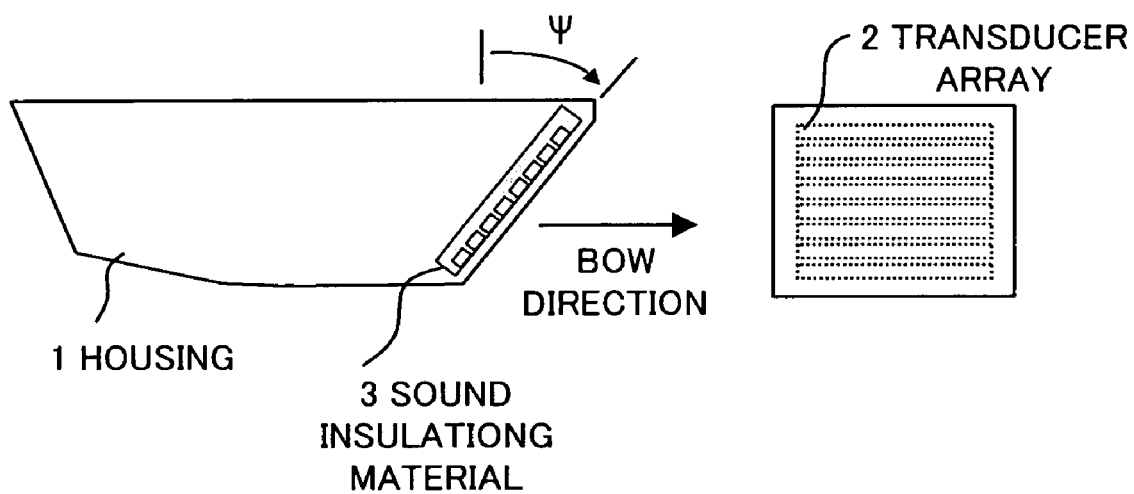
FIG. 2 is a diagram generally showing the structure of a transducer of the forward-looking sonar.

FIG. 1 is a block diagram of a forward-looking sonar according to a first embodiment of the invention, and FIG. 2 is a diagram generally showing the structure of a transducer 10 of the forward-looking sonar.

The transducer 10 includes a housing 1 and a transducer array 2 fixed to the housing 1. The transducer array 2 is made up of a plurality of transducer elements which are arranged in line, constituting a linear array. Generally, the transducer array 2 is installed at the bow of a vessel with a radiating surface (front surface) of the transducer 10 oriented in a forward direction of the vessel and inclined downward by a properly determined tilt angle $\Psi$ (typically 30 degrees to 45 degrees) from a vertical direction as shown in FIG. 2. Side and rear surfaces of the individual transducer elements are covered by a sound insulating material 3, such as cork, whereas the front surface of the transducer 10, through which acoustic waves are radiated and received, is covered with a synthetic resin material, such as urethane which does not adversely affect propagation of the acoustic waves. The housing 1 serves to waterproof and hold the transducer array 2.

As shown in FIG. 1, the forward-looking sonar includes in addition to the aforementioned transducer 10, a transmitting beamforming section 11, a receiver block 12 and a display section 13.

The transducer elements of the transducer array 2 is divided into two groups, that is, a group of upper four transducer elements which together constitute a first sub array A and a group of lower four transducer elements which together constitute a second sub array B. The receiver block 12 includes a first beamforming section 12a for forming a first receiving beam B1 by the first sub array A and a second beamforming section 12b for forming a second receiving beam B2 by the second sub array B.

The receiver block 12 further includes a position measurement section 12c, an amplitude measurement section 12d and a direction-amplitude synthesizing section 12f.

When hit by acoustic waves radiated from the transducer array 2, an underwater target reflects part of sound energy, or an echo, back to the transducer array 2. The position measurement section 12c calculates the direction of the target within a fan-shaped sounding area formed in a vertical plane from a phase difference between echo signals picked up by the first and second receiving beams B1, B2. The position measurement section 12c also calculates the distance to the target from time needed for receiving the echo from the target after transmission. The position measurement section 12c then determines the position of the target based on the direction and the distance thus obtained.

Figure 3:
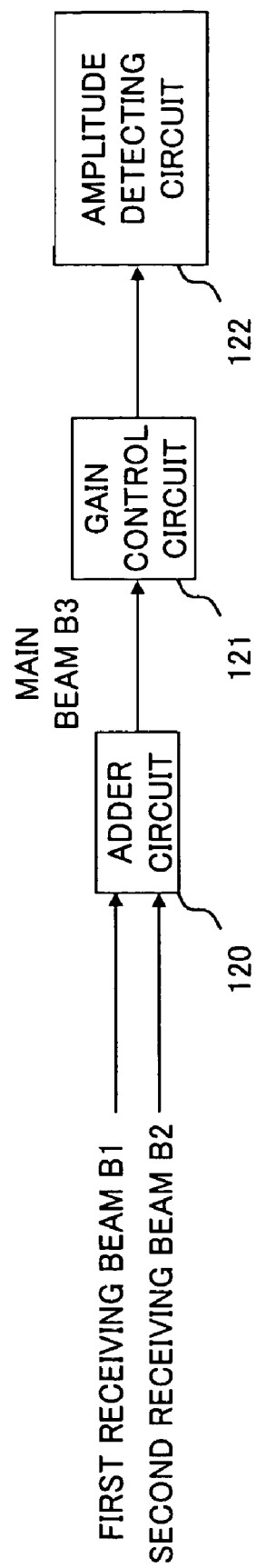
FIG. 3 is a block diagram of an amplitude measurement section.

FIG. 3 is a block diagram of the direction-amplitude synthesizing section 12f. As shown in FIG. 3, the amplitude measurement section 12d includes an adder circuit 120, a gain control circuit 121 and an amplitude detecting circuit 122. The adder circuit 120 adds, or combines, a first receiving beam B1 formed by the first beamforming section 12a and a second receiving beam B2 formed by the second beamforming section 12b to create a narrow main beam B3 formed by all of the transducer elements. The main beam B3 is identical to a receiving beam formed by a conventional scanning sonar. The gain control circuit 121 properly adjusts gain of the main beam B3 and the amplitude detecting circuit 122 detects the amplitude of a signal representative of echo intensity obtained by the main beam B3.

The direction-amplitude synthesizing section 12f assigns an amplitude value obtained by the amplitude measurement section 12d to an echo position corresponding to the position of the target obtained by the position measurement section 12c.

The display section 13 converts amplitude-direction data including amplitude information obtained by the direction-amplitude synthesizing section 12f into data for on-screen display formatted for an X-Y coordinate system and presents the X-Y coordinate formatted data on a display screen with the amplitude information converted into color information.

The transmitting beamforming section 11 forms a transmitting beam having desired transmitting directivity by supplying transmit signals of a specific amplitude to the individual transducer elements with a particular phase difference among the transmit signals. The transmitting beam is formed by using all of the transducer elements. The transmitting beam typically has a beam angle of 90 degrees or more to cover a sector area from the sea surface to the bottom immediately below the vessel. Needless to say, the beam angle may be otherwise set by properly controlling phases of the transmit signals supplied to the transducer elements. For example, the transmitting beamforming section 11 can form a transmitting beam having a small beam angle to search across a horizontally narrow sounding area ahead of the vessel. When the transmitting beam is narrowed, the transducer array 2 can radiate acoustic waves at a higher source level, offering thereby an increased sounding range.

Figure 4A:
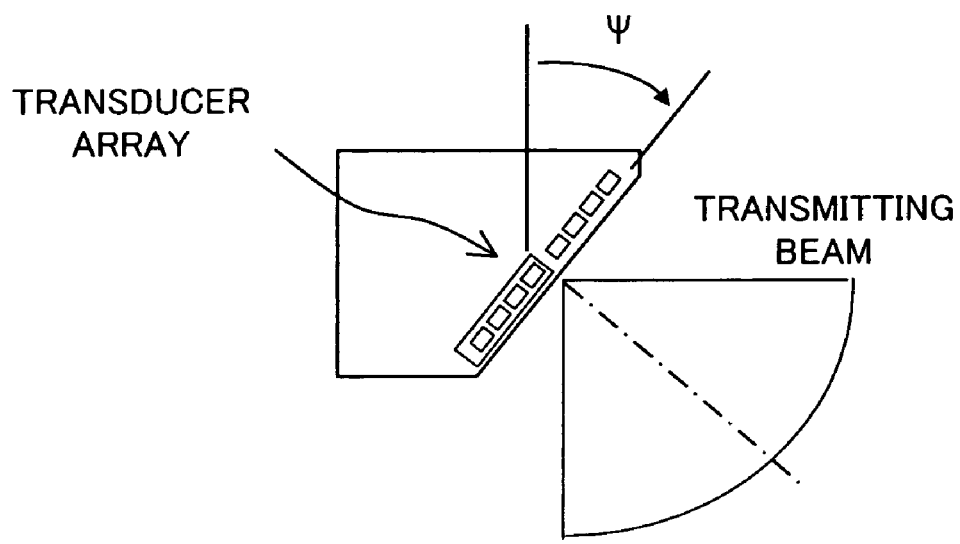
FIGS. 4A and 4B are diagrams showing how a transducer array forms a transmitting beam.
Figure 4B:
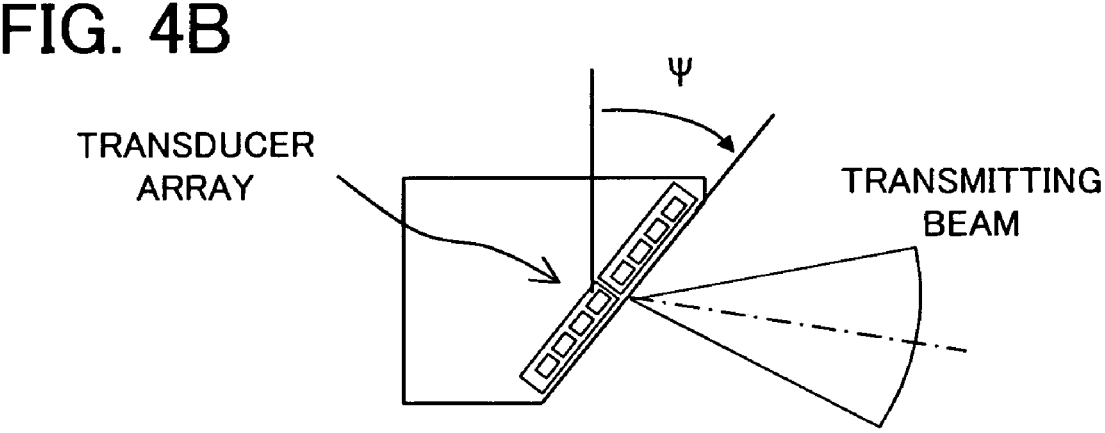

FIGS. 4A and 4B are diagrams illustrating how the transducer array 2 forms the transmitting beam, FIG. 4A showing an example in which the transmitting beam has a beam angle equal to or larger than 90 degrees to cover a vertically wide sector area from the sea surface to the bottom immediately below the vessel, FIG. 4B showing an example in which the transmitting beam has a vertically narrow beam angle.

Figure 30:
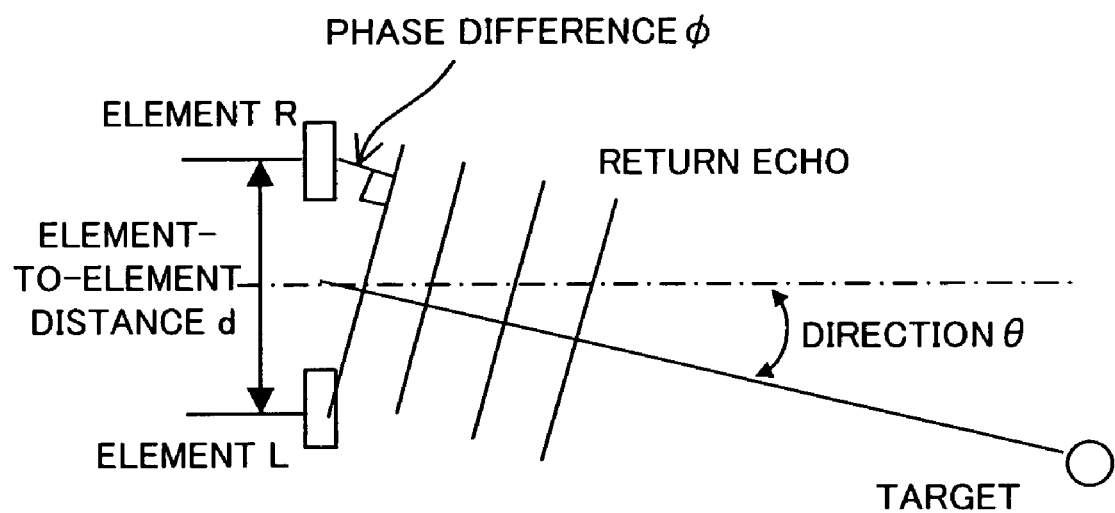
FIG. 30 is a diagram for explaining the principle of the split-beam method of FIG. 29.
Figure 31:
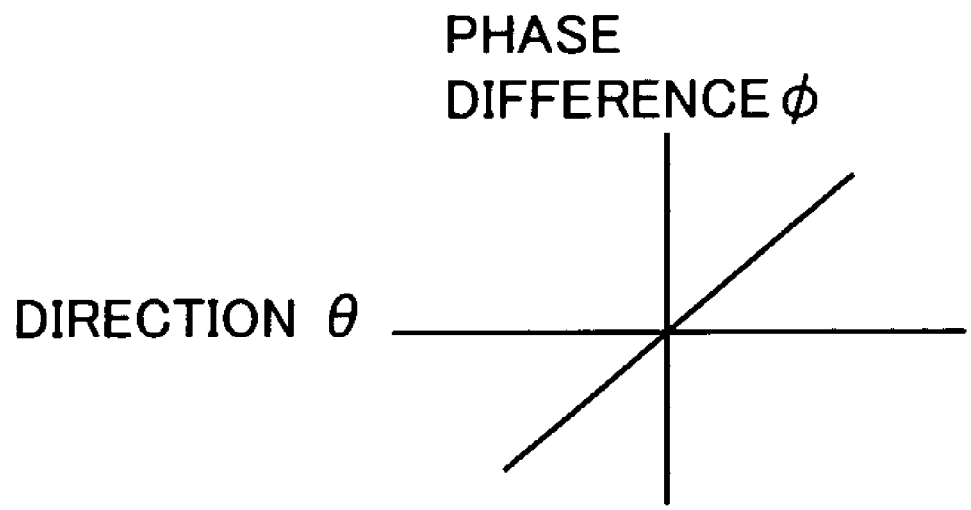
FIG. 31 is a diagram showing a relationship between the direction of a detected target and a phase difference measured by the split-beam method.
Figure 32:
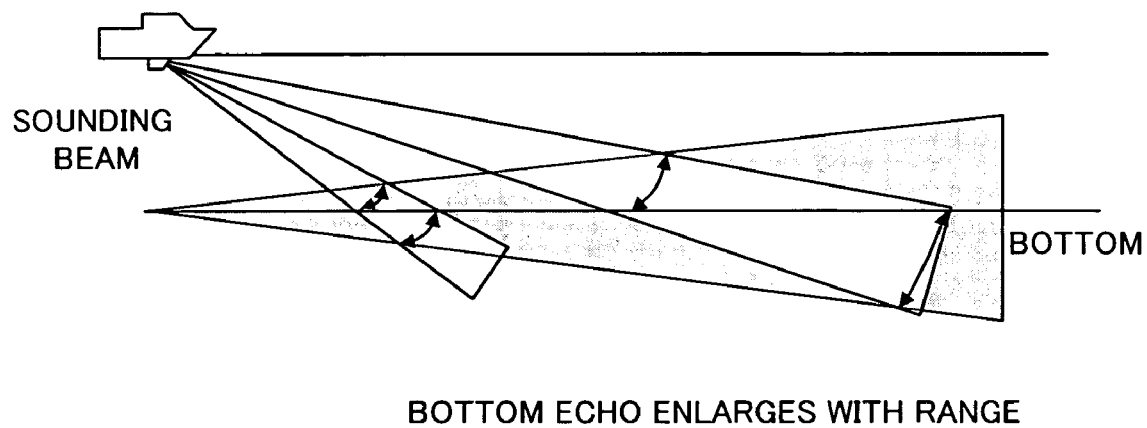
FIG. 32 is a diagram showing how the sea bottom detected by the transmitting/receiving beam is displayed.

FIGS. 5A and 5B are diagrams showing two kinds of receiving beamforming method. The transducer array 2 forms the two receiving beams B1, B2 by the same principle of the split-beam method as illustrated in FIG. 30. The two receiving beams B1, B2 formed by the split-beam method are used for determining the direction of a target.

In the split-beam method shown in FIG. 5A (first embodiment), the transducer array 2 is divided into two sub arrays. These sub arrays are the aforementioned first sub array A formed by the upper four transducer elements and the aforementioned second sub array B formed by the lower four transducer elements. In this split-beam method, a "sub-array interval" is the distance between the centers of the upper four-element sub array A and the lower four-element sub array B.

The split-beam method shown in FIG. 5B is a variation of the split-beam method of FIG. 5A, in which the transducer array 2 is also divided into two sub arrays but in different combinations of the transducer elements. These two sub arrays are a sub array A formed by the upper seven transducer elements and a sub array B formed by the lower seven transducer elements. In this split-beam method, an "sub-array interval" is the distance between the centers of the upper seven-element sub array A and the lower seven-element sub array B, the sub array A and the sub array B overlapping each other at the central six transducer elements.

In the split-beam method of FIG. 5A, each of the sub arrays A, B is formed by a minimum number of transducer elements so that the receiving beams B1, B2 each have a wide beam angle. The transducer array 2, when used in this split-beam method, however has a maximum sub-array interval so that there is a large phase difference between echo signals picked up by the two receiving beams B1, B2, and this makes it possible to measure the direction of a target with high precision. In the split-beam method of FIG. 5B, on the other hand, each of the sub arrays A, B is formed by a maximum number of transducer elements so that the receiving beams B1, B2 each have a narrow beam angle. The transducer array 2, when used in this split-beam method, however has a small sub-array interval so that there is a small phase difference between echo signals picked up by the two receiving beams B1, B2 and, therefore, the accuracy of target direction measurement is poor. Thus, the first embodiment of the invention employs the split-beam method depicted in FIG. 5A to achieve a high accuracy of target direction measurement. As another variation of the split-beam method, an intermediate number of transducer elements, between the minimum and maximum numbers of transducer elements used in configurations of FIGS. 5A and 5B, may be used to form a pair of sub arrays A, B.

Operation of the position measurement section 12c is now described in detail.

As already mentioned, the position measurement section 12c determines the direction of a target within a wide fan-shaped sounding area formed in a vertical plane based on the phase difference between echo signals picked up by the first and second receiving beams B1, B2. The position measurement section 12c also calculates the distance to the target from time needed for receiving the echo from the target after transmission. The position measurement section 12c then determines the position of the target based on the direction and the distance thus obtained. The aforementioned split-beam method (FIG. 5A) is used for producing the receiving beams B1, B2 in determining the direction of the target within the fan-shaped sounding area.

Figure 6:
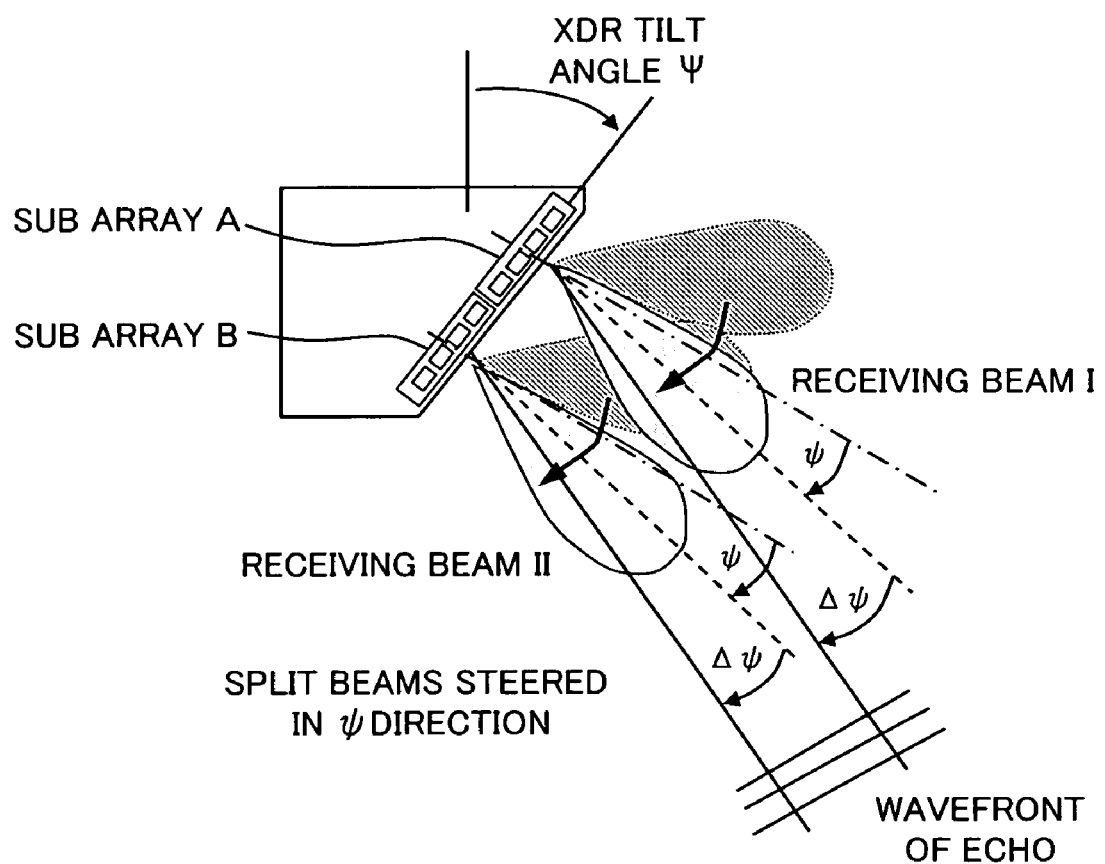
FIG. 6 is a diagram showing the principle of target direction determination by a split-beam method.

FIG. 6 is a diagram showing the principle of target direction determination by the split-beam method used in the present embodiment. As shown in FIG. 6, phase difference φ varies with beam direction. Steering direction ψ at which the phase difference φ becomes zero is the direction from which the target echo arrives. In practice, incoming direction Δψ of an echo falling within a predefined phase range ±Δφ (e.g., ±5 degrees) close to zero is obtained by the split-beam method taking into consideration various error factors. The incoming direction of the echo is given by the sum of the steering angle ψ and split direction Δψ, that is, ψ+Δψ.

If the beam direction is varied discontinuously or in discrete steps of a predetermined step angle ψs (which is not larger than the beam angle), the step angle ψs is added to the phase range ±Δφ to determine the target direction (echo direction) within a range of ±(Δφ+φs/2) between the two adjacent beams. The actual echo direction relative to the sea surface is obtained by adding the transducer tilt angle Ψ. Thus, the actual echo direction is Ψ+(ψ+Δψ).

FIGS. 7A, 7B and 7C are diagrams showing a relationship between the phase difference and the target direction.

FIG. 7A shows the amplitude of an echo signal detected by the narrow main beam B3 formed by all of the transducer elements as in a conventional sector scanning sonar. A specific threshold is set for the echo signal amplitude, and the phase difference between echo signals having a level equal to or higher than the threshold is determined.

FIG. 7B shows how phase difference φ between the echo signals detected by the individual receiving beams varies when the receiving beams (split beams) are steered (rotated). When the steering angle ψ becomes normal to the wavefront of an echo, the phase difference φ between the echo signals detected by the individual receiving beams becomes zero. The echo direction is calculated (measured) by the split-beam method from the phase difference between the echo signals obtained from an echo within a range of steering directions ψ±Δψ in which the phase difference falls within a range of 0±Δφ.

FIG. 7C shows the echo direction calculated by the split-beam method shown in FIG. 7B. A broken line of FIG. 7C shows the echo direction obtained from only the amplitude of the echo signal shown in FIG. 7A as in the case of a conventional method. It is obvious from FIG. 7C that the echo direction is obtained with a higher resolution by the split-beam method than by the conventional method. FIG. 7C shows the amplitude information (i.e., echo intensity on the vertical axis) in addition to the echo direction. The amplitude information is acquired from the echo signal shown in FIG. 7A obtained by the main beam B3.

The forward-looking sonar of the embodiment simultaneously determines the directions of individual echoes received within a 90-degree sounding area below the sea surface in the aforementioned manner.

Figure 8A:
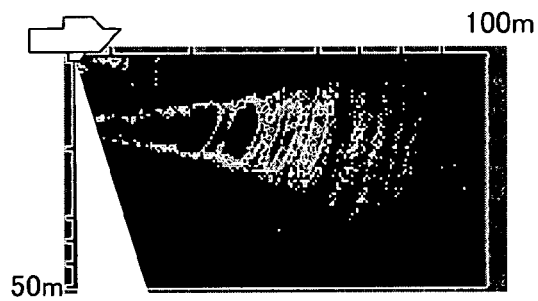
FIGS. 8A and 8B are diagrams showing an example of an image displayed on-screen by using only amplitude information of echoes received from a sea bottom (FIG. 8A) and an example of an image displayed on-screen by using echoes received from the same sea bottom by the split-beam method of the embodiment (FIG. 8B)
Figure 8B:
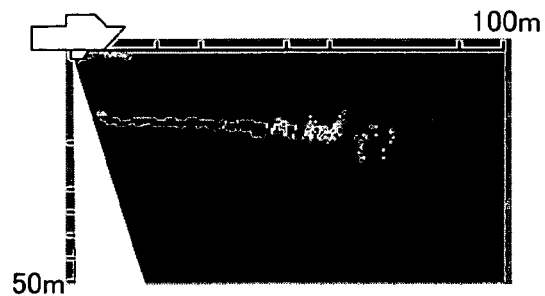

FIGS. 8A and 8B are diagrams showing an example of an image displayed on-screen by using only amplitude information of echoes received from a sea bottom (FIG. 8A) and an example of an image displayed on-screen by using echoes received from the same sea bottom by the split-beam method of the embodiment (FIG. 8B).

Figure 9A:
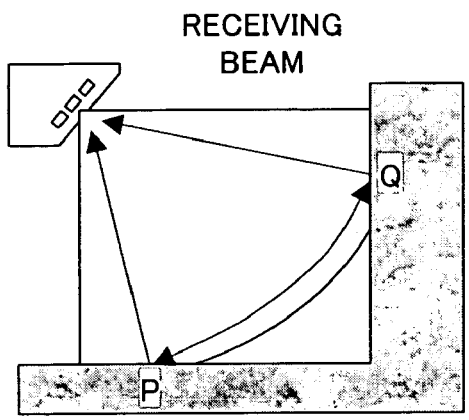
FIGS. 9A and 9B are diagrams explaining an advantage of the first embodiment.
Figure 9B:
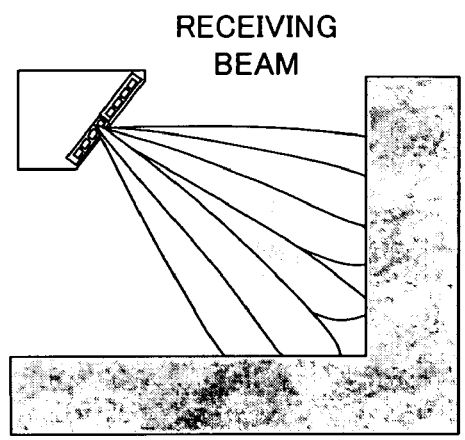

FIGS. 9A and 9B are diagrams explaining a conventional sounding technique employing the split-beam method (FIG. 9A) and a sounding technique employing the split-beam method of the embodiment (FIG. 9B). Since the conventional sounding technique uses a receiving beam having a fixed wide beam angle, echoes from targets located at equidistant points P and Q but in different directions arrive at the same time. It is therefore impossible to distinguish these echoes from each other, and this results in an echo signal dropout. Compared to the conventional sounding technique, the split-beam method of the embodiment uses a plurality of receiving beams having a narrow beam angle which are steered to cover a wide sounding area, so that the forward-looking sonar of the embodiment can distinguish echoes from multiple targets and determine the directions of the individual targets. Therefore, the number of echoes received at the same time decreases and echo signal dropouts occur less frequently.

In FIGS. 7A, 7B and 7C, the horizontal axis represents the angular direction below the sea surface and the echo direction is calculated (measured) by the split-beam method from the phase difference between the echo signals obtained from an echo from a target within the steering direction range ψ±Δψ. The embodiment may be modified such that the horizontal axis represents the distance and the distance to the target is calculated (measured) by the split-beam method from the phase difference between the echo signals obtained within the steering direction range ψ±Δψ. The target direction thus obtained matches the direction of an acoustic axis (approximately at the middle of the beam angle) of each of the receiving beams B1, B2. The target direction may be expressed by the direction of an acoustic axis of the main beam B3.

According to the split-beam method of the foregoing embodiment, the two receiving beams B1, B2 (split beams) are steered along the fan-shaped sounding area (beam steering system). The embodiment may be so modified as to form a large number of receiving beams oriented in different directions within the fan-shaped sounding area, wherein these receiving beams wait and receive echoes returning from the individual directions (wait-and-receive system) and the direction of each echo is determined by the split-beam method using two of the receiving beams. In the aforementioned beam steering system, the two receiving beams receive echo signals from one direction at each instant. Thus, the beam steering system has an advantage that this system does not impose so heavy a work load in processing operation executed after beamforming. The beam steering system however has a disadvantage that attainable range resolution is limited by beam steering rate (period). On the other hand, the wait-and-receive system has an advantage that it allows for a high range resolution as well as a disadvantage that the system imposes a heavy work load for simultaneously processing echo signals received by the multiple receiving beams.

Second Embodiment

FIG. 10 is a block diagram of a forward-looking sonar according to a second embodiment of the invention. The forward-looking sonar of the second embodiment differs from that of the first embodiment (FIG. 1) in that the former additionally includes a synthesizer section 12e. In FIG. 10, elements identical or similar to those of the first embodiment are designated by the same reference numerals.

The synthesizer section 12e calculates the center of gravity of echo intensities of an echo detected by the main beam B3 as well as the variance of echo intensities along a range direction in each main beam direction. Then, the synthesizer section 12e determines the position of the echo (target) from the center of gravity within a range below a predefined variance value and synthesize the position thus obtained with the position of the echo (target) determined by the position measurement section 12c.

Figure 11A:
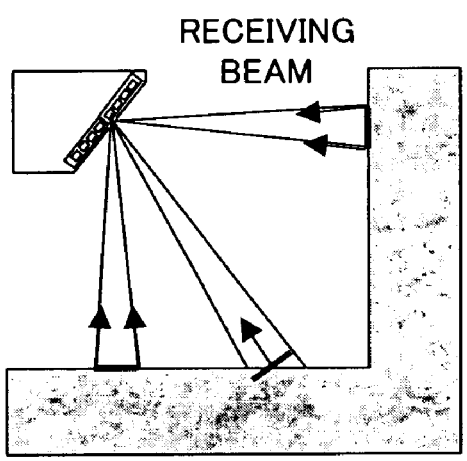
FIGS. 11A and 11B are diagrams showing how echo signal dropouts occur in the split-beam method.
Figure 11B:
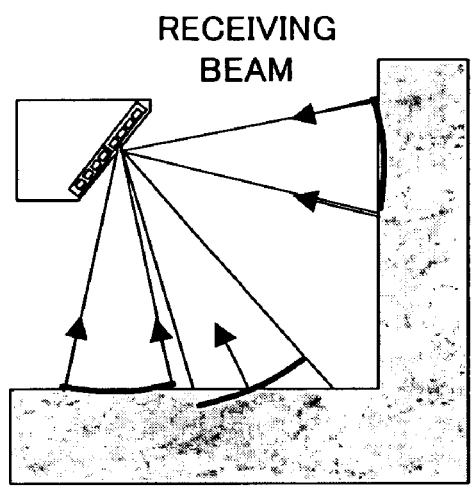

Although it is possible to decrease the number of echo signal dropouts by detecting echoes within a wide sounding area by steering the receiving beam as shown in FIG. 9B, echo signal dropouts may still occur as shown in FIGS. 11A and 11B. FIG. 11A shown a situation in which the receiving beam is oriented at right angles to a quay or the sea bottom immediately below, wherein each thick black line segment passing across the receiving beam shows pulselength of the acoustic waves radiated. When the acoustic axis of the receiving beam is at an oblique angle to a target area, echoes from multiple points within the beam angle are not received at the same time. When the acoustic axis of the receiving beam is at right angles to the target area, echoes from multiple points within the beam angle are received at the same time during a time period corresponding to the pulselength. As will be recognized from a comparison between FIGS. 11A and 11B, the larger the beam angle, the longer the time period during which echoes from multiple points within the beam angle are received at the same time. This would impose limitations on efforts directed to developing a compact and low-cost forward-looking sonar.

FIGS. 12A, 12B and 12C are diagrams showing echo signals received at the same time. When two echo signals overlap, the measured phase difference is disturbed, and only one echo signal is detected with the other echo signal dropped.

Figure 13A:
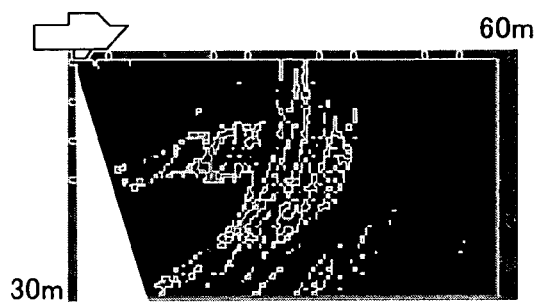
FIGS. 13A and 13B are diagrams showing examples of on-screen displays obtained by a conventional beamforming method and the split-beam method of the first embodiment.
Figure 13B:
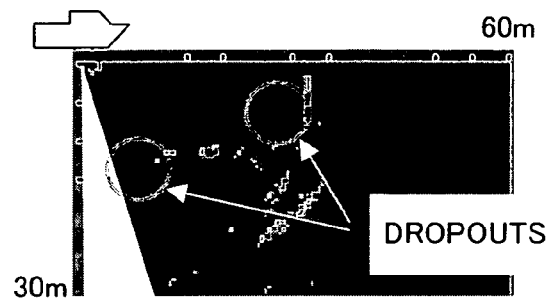

FIGS. 13A and 13B show an example of an amplitude display obtained by a conventional beamforming method and an example of an on-screen display obtained by the first embodiment using the split-beam method. While an area of the sea bottom immediately below the vessel is not displayed in either of these examples, there is shown a quay approximately 25 m ahead of the vessel. Although no dropouts of echoes occur in the amplitude display obtained by the conventional beamforming method as shown in FIG. 13A, echoes from part of the quay and the sea bottom are missing in the on-screen display obtained by the first embodiment as shown in FIG. 13B.

In the forward-looking sonar of the second embodiment, the synthesizer section 12e prevents such dropouts of echoes as shown in FIG. 13B.

The synthesizer section 12e serves a function of calculating the center of gravity of echo signal intensities of an echo detected by the main beam B3 of FIG. 3, determining the position of the echo (target) from the direction of the main beam B3 and the calculated center of gravity, and synthesizing the position thus obtained with the position of the echo (target) determined by the position measurement section 12c.

The aforementioned center of gravity is calculated as follows.

Figure 14A:
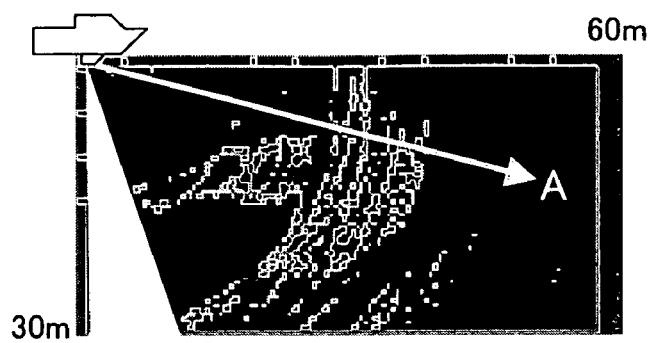
FIGS. 14A and 14B are diagrams illustrating a method of determining the center of gravity of echo signal intensities.
Figure 14B:
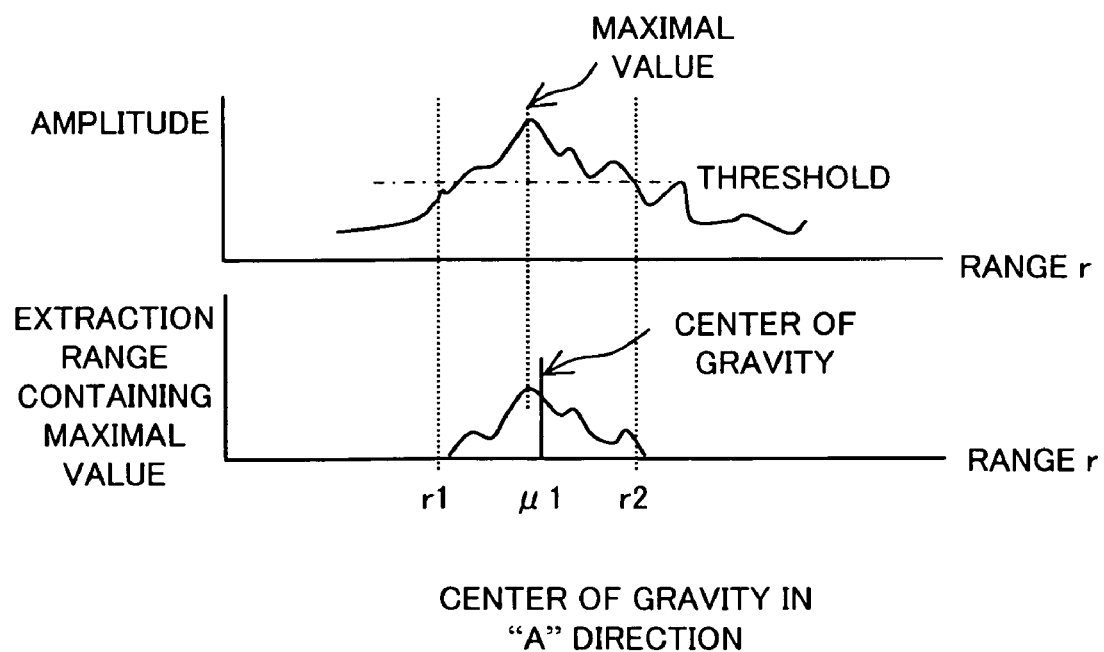

Referring to FIGS. 14A and 14B, echo signals received from each direction of the main beam B3 are arranged along a time axis. For example, echo signals received from a direction shown by an arrow "A" in FIG. 14A are arranged and a maximal value of echo levels in the "A" direction is determined. Echo signals of which amplitudes are equal to or larger than a specific amplitude value which is properly determined from the maximal value of echo levels are extracted within a predetermined distance range containing a point of the maximal value of echo levels. Then, the center of gravity of the amplitudes of the extracted echo signals is determined within the properly determined distance range (FIG. 14B). The center of gravity of the echo signal amplitudes thus determined corresponds to the location of the sea bottom or a quay.

The center of gravity $\mu1$ of the echo signal amplitudes is calculated by equation (3) below:

$$\mu1 = \frac{\int_{r=r1}^{r2} L(r) \cdot r}{\int_{r=r1}^{r2} L(r)} \quad (3)$$

where r is the distance in the beam direction, L(r) is the echo level, and r1 and r2 are lower and upper limits of the aforementioned distance range. The synthesizer section 12e performs the aforementioned calculation for individual directions of the main beam B3.

The synthesizer section 12e determines the position of the echo (target) corresponding to the center of gravity $\mu1$ of the echo signal amplitudes from the center of gravity $\mu1$ thus calculated and the direction of the main beam B3. The synthesizer section 12e then synthesizes the position of the echo (target) thus obtained with the position of the echo (target) determined by the position measurement section 12c from the direction of the echo (target) calculated by the split-beam method and the distance to the echo (target) calculated from time needed for receiving the echo from the target after transmission.

Figure 15A:
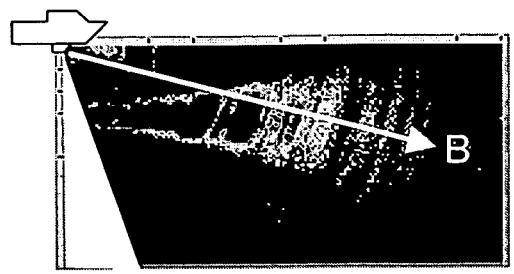
FIGS. 15A, 15B and 15C are diagrams showing a situation in which the calculated center of gravity of echo signal intensities deviates from a true echo position.
Figure 15B:
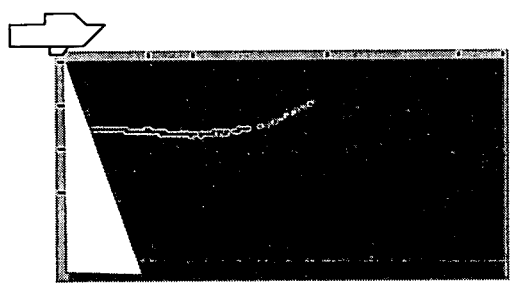
Figure 15C:
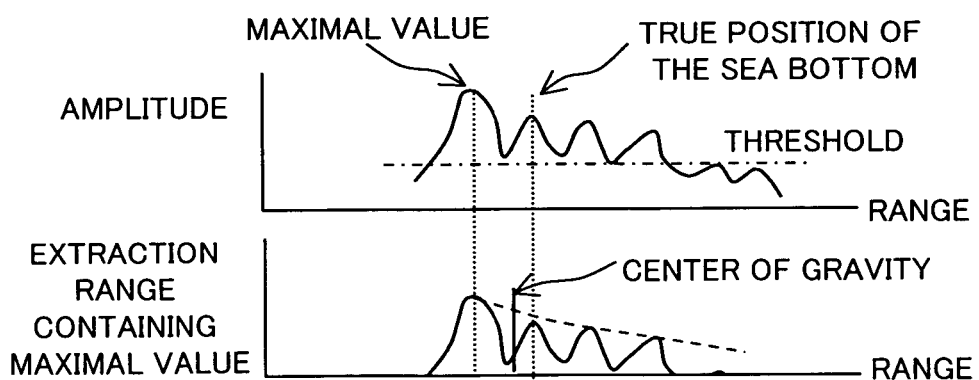

Although the synthesizer section 12e may calculate the center of gravity of signal intensities of every echo received from the individual directions of the main beam B3 in the aforementioned manner, the center of gravity of echo signal intensities may not be correctly calculated depending on the direction (tilt angle) of the main beam B3. When the forward-looking sonar detects a flat sea bottom at a far range, for instance, the echo signal intensity (amplitude) gradually decreases with an increase in distance. As a result, the center of gravity of echo signal intensities determined by the synthesizer section 12e deviates from a true echo position (toward a near side in a practical situation). FIGS. 15A, 15B and 15C are diagrams showing such a situation. FIG. 15A shows an echo (amplitude) image of a flat sea bottom at a far range, and FIG. 15C shows the amplitude of echo signals received from a direction shown by an arrow "B" in FIG. 15A. It is recognized from FIG. 15C that the echo signal intensity (amplitude) gradually decreases with an increase in distance on the flat sea bottom at a far range. FIG. 15B shows the center of gravity of the echo signal intensities determined in the aforementioned manner. Therefore, if the center of gravity of the echo signal intensities is calculated by using the same threshold as used for other receiving beams, the calculated center of gravity of the echo signal intensities deviates from the true position of the sea bottom.

Under such circumstances, the synthesizer section 12e calculates the variance of echo signal intensities (amplitudes) along the range direction in each main beam direction. Only when the variance is equal to or lower than a specific threshold, the center of gravity of echo signal intensities detected by the receiving beam in the range direction is subjected to the aforementioned synthesis operation.

More specifically, the synthesizer section 12e calculates the variance of the echo signal amplitudes and, if there is a region in which the variance exceeds the threshold as in the "B" direction shown in FIG. 15A, echo signals in that region come from echoes from a target area to which the acoustic axis of the receiving beam is at an oblique angle. Since the synthesizer section 12e can not exactly calculate the position of the sea bottom in such an oblique angle region, the calculated center of gravity is not subjected to the aforementioned synthesis (interpolation) operation. Generally, a frontal echo image of such a target as the sea bottom or a quay which is likely to cause echo signal dropouts is a region where echoes are presented with sharply varying signal intensities along the range direction as the "A" direction shown in FIG. 14A. Since the variance of the echo signal amplitudes is small in such a region, the calculated center of gravity is subjected to the synthesis operation (interpolation).

Figure 16:
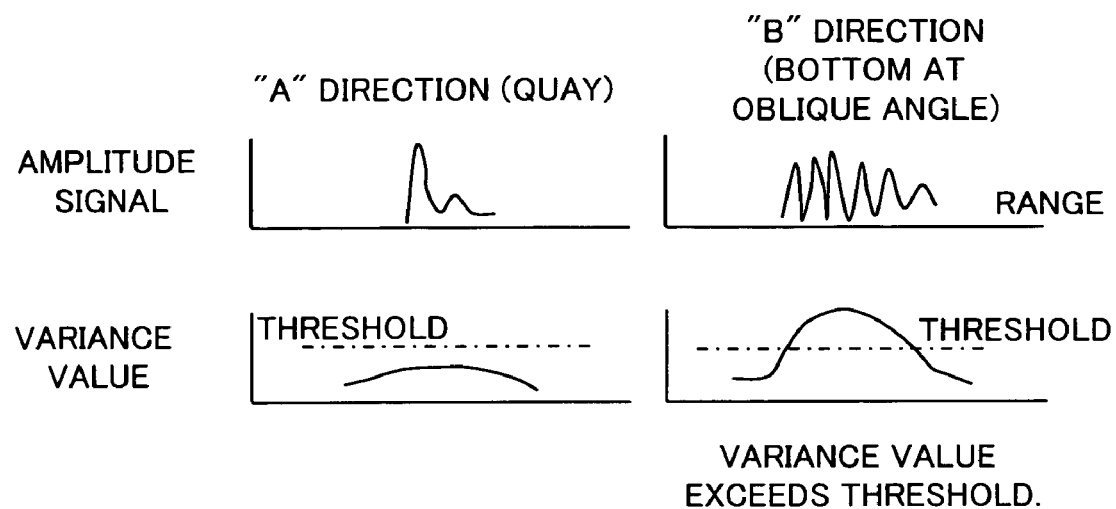
FIG. 16 is a diagram showing variance values obtained from echoes from a quay and a sea bottom detected at an oblique angle.

FIG. 16 is a diagram showing echo signal amplitudes and variance values obtained from echo signals received from the "A" direction and the "B" direction. Using the previously determined center of gravity μ1 of the echo signal amplitudes, the distance r in the beam direction, the echo level L(r), and the distances r1, r2 to echo extraction start and end points, the variance value μ2 is calculated by equation (4) below:

$$\mu 2 = \frac{\int_{r=r1}^{r2} L(r) \cdot (r - \mu 1)^2}{\int_{r=r1}^{r2} L(r)} \quad (4)$$

The synthesizer section 12e the center of gravity μ1 with the position of the echo (target) determined by the position measurement section 12c, and the direction-amplitude synthesizing section 12f assigns the amplitude value obtained by the amplitude measurement section 12d to the echo position obtained by the synthesizer section 12e.

Figure 18:
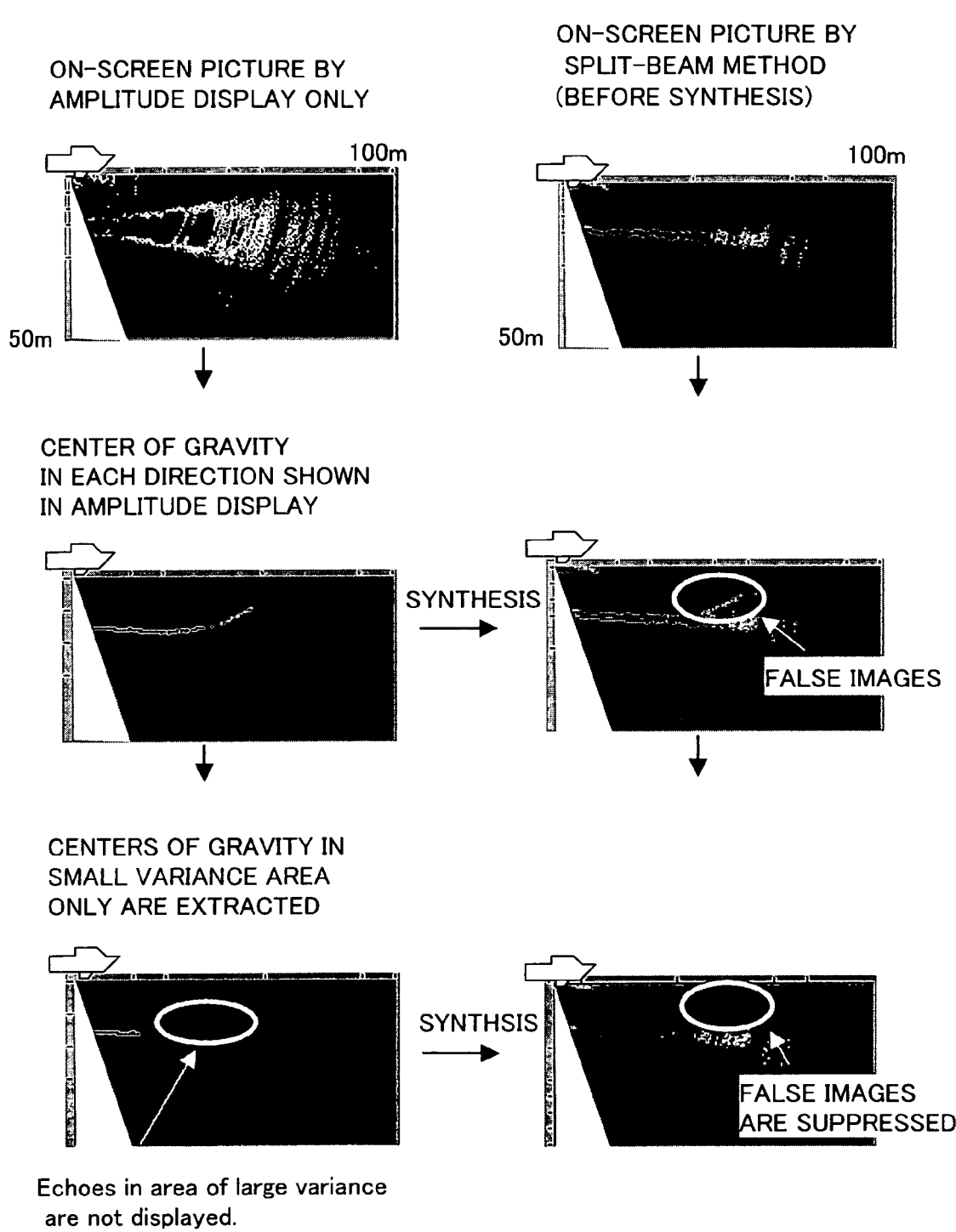
FIG. 18 shows examples of on-screen pictures, in which there are no dropouts in echo signals, and false images caused by the synthesis (interpolation) operation are suppressed by mathematically processing the variance values.

FIG. 17 shows examples of on-screen pictures obtained in the aforementioned manner by the second embodiment. These examples of the on-screen pictures include pictures obtained by performing the synthesis (interpolation) operation on images with echo signal dropouts produced from echoes from a quay and the sea bottom immediately below. FIG. 18 shows examples of on-screen pictures, in which there are no dropouts in echo signals, and false images caused by the synthesis (interpolation) operation are suppressed by mathematically processing the variance values.

As mentioned in the foregoing discussion, the synthesizer section 12e calculates the variance of echo intensities (amplitudes) along the range direction in each direction of the receiving beam, and only when the variance is equal to or lower than the specific threshold, the center of gravity of echo signal intensities detected by the receiving beam in the range direction is subjected to the aforementioned synthesis operation. As a result, it is possible to display a picture of detected echoes free of echo signal dropouts and false images.

While the synthesizer section 12e calculates the center of gravity of echo intensities in the second embodiment thus far described, the embodiment may be modified to simply calculate the maximal value of echo intensities instead of the center of gravity thereof for mitigating the work load needed for mathematical operation. Since the center of gravity of echo intensities is always located close to the maximal value thereof as shown in FIG. 14B, it is possible to prevent echo signal dropouts by using the maximal value. When calculating the variance of echo intensities, the maximal value of the echo intensities along the range direction in each direction of the receiving beam only when the variance is equal to or lower than the specific threshold.

Third Embodiment

A third embodiment of the invention is now described.

Figure 19A:
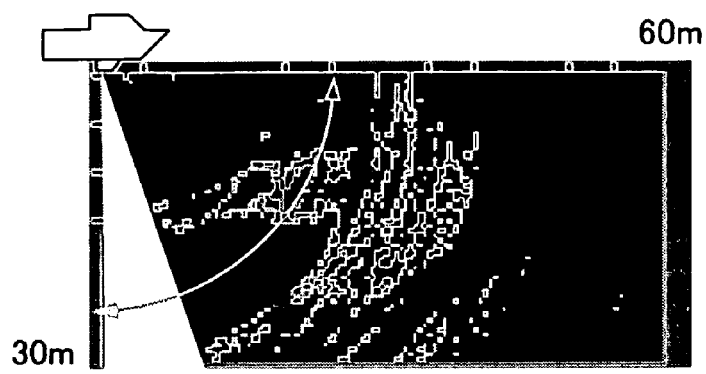
FIGS. 19A and 19B are diagrams illustrating a method of determining the center of gravity of echo signal intensities along a beam steering direction according to a third embodiment of the invention.
Figure 19B:
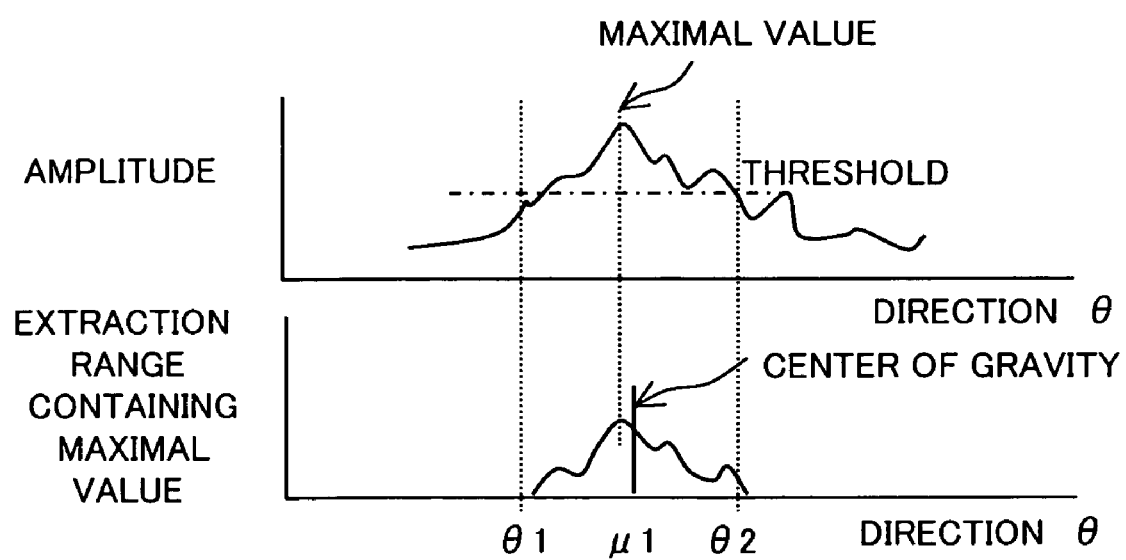

In this embodiment, the synthesizer section 12e calculates the center of gravity of echo intensities of an echo detected by the main beam B3 (refer to FIG. 3) along a beam steering direction at each distance. Then, the synthesizer section 12e determines the position of the echo (target) from the distance to the echo (target) and the center of gravity and synthesize the position thus obtained with the position of the echo (target) determined by the aforementioned position measurement means. FIGS. 19A and 19B are diagrams illustrating a method of determining the center of gravity of echo signal intensities along a beam steering direction.

Echo signals obtained from an amplitude display of FIG. 19A are arranged along the beam steering direction θ (FIG. 19B) and a maximal value of echo levels is determined. Echo signals of which amplitudes are equal to or larger than a specific amplitude value which is properly determined from the maximal value of echo levels are extracted within a predetermined distance range containing a point of the maximal value of echo levels. Then, the center of gravity of the amplitudes of the extracted echo signals is determined within the properly determined distance range (FIG. 19B). The center of gravity of the echo signal amplitudes thus determined corresponds to the location of the sea bottom or a quay. The direction-amplitude synthesizing section 12f performs the same function as described in the foregoing embodiments.

Fourth Embodiment

A fourth embodiment of the invention is now described.

In this embodiment, there is not provided the synthesizer section 12e but the position measurement section 12c performs a control operation for expanding the width of the direction of an echo determined based on the phase difference.

Figure 20:
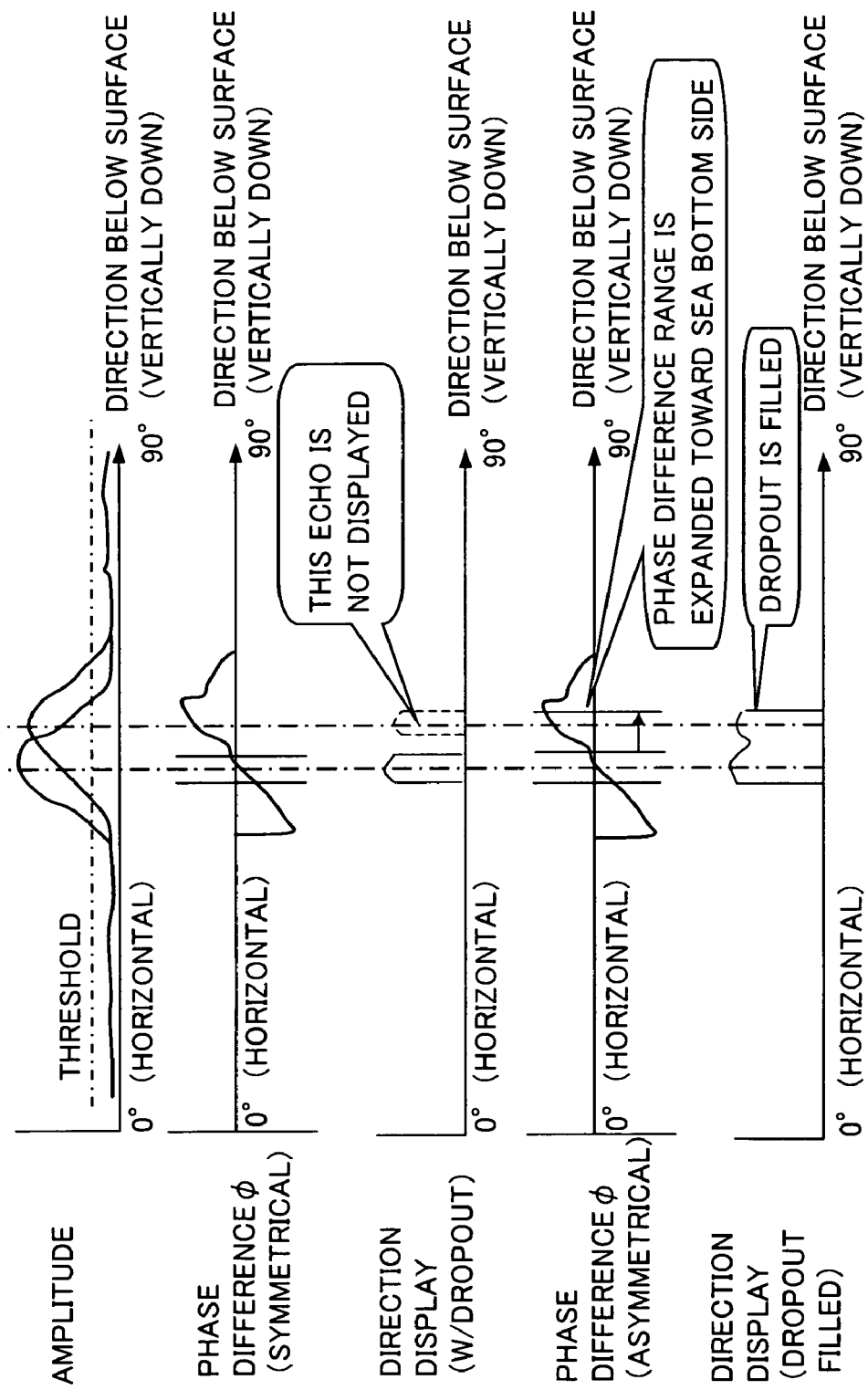
FIG. 20 is a diagram showing contents of a control operation performed by a position measurement section according to a fourth embodiment of the invention.

FIG. 20 is a diagram showing contents of the control operation performed by position measurement section 12c.

The above-described split-beam method presents an echo in a direction within the steering direction range ψ±Δψ in which the phase difference falls within a range of 0±Δφ as shown in FIGS. 6, 7A, 7B and 7C. Therefore, an echo of which phase difference exceeds ±Δφ is not displayed on-screen, causing a dropout. While the number of echo signal dropouts decreases if the range of phase difference widened, bottom sounding accuracy decreases.

If, however, the symmetrically set phase difference range ±Δφ is made asymmetrical by expanding the range on only a downward side of the sea bottom, for example, it is possible to expand a display area on the downward side of the sea bottom and thereby decrease the number of echo signal dropouts without causing a decrease in sounding accuracy on an upward side of the sea bottom.

The position measurement section 12c performs the control operation on the receiving beam for expanding the symmetrically set phase difference range ±Δφ on the downward side of the sea bottom and other areas where echo signal dropouts are likely to occur, or the position measurement section 12c performs the control operation for expanding the width of an echo along the angular direction (beam steering direction) based on the phase difference as discussed above. This approach of the present embodiment serves to decrease the number of echo signal dropouts while avoiding a decrease in sounding accuracy.

Figure 21:
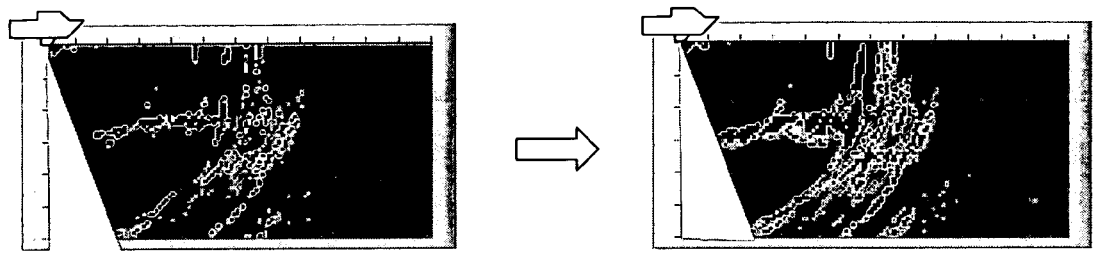
FIG. 21 shows examples of on-screen display obtained by the fourth embodiment.

This approach of the embodiment is advantageous in that the configuration of the forward-looking sonar and processing are simplified compared to the forward-looking sonar of the second embodiment employing the synthesizer section 12e. Additionally, although echo signal dropouts are not completely eliminated, a practically sufficient level of advantageous effect is achieved by this embodiment. When the target is a quay, for example, echoes from an area of the quay close to the sea surface where the transmitting beam hits the target generally at right angles have large amplitudes and dropouts are less likely to occur in the echoes from this area of the quay. By comparison, echoes from a lower area of the quay where the transmitting beam hits the target at oblique angles have small amplitudes and dropouts tend to occur in the echoes from this area of the quay. The forward-looking sonar of the present embodiment can avoid echo signal dropouts by setting an asymmetrical phase difference range for such an oblique angle target area. FIG. 21 shows examples of on-screen display obtained by the present embodiment. It can be seen from FIG. 21 that when the phase difference range is set to −10 degrees to 120 degrees, the phase difference range thickens and echo signal dropouts are filled.

Fifth Embodiment

Figure 22:
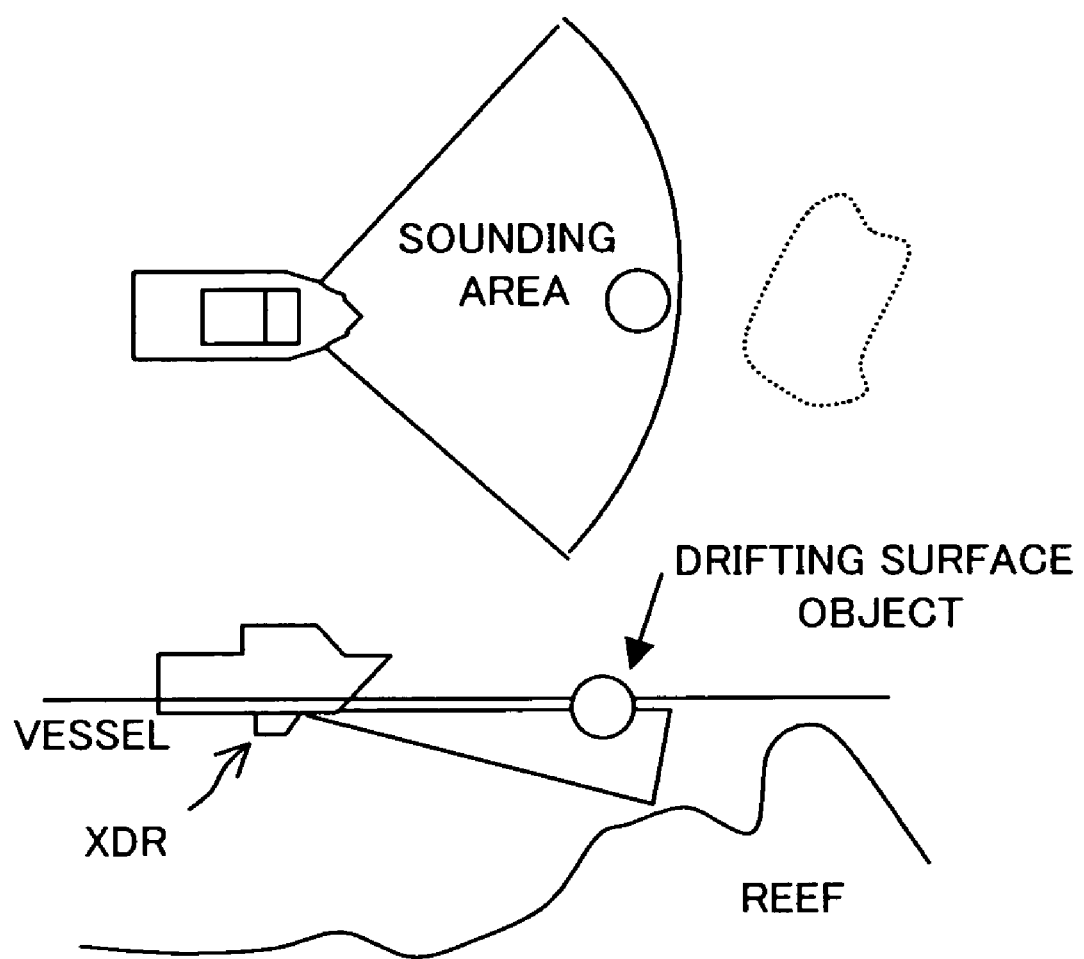
FIG. 22 is a diagram showing a fifth embodiment of the invention.

FIG. 22 is a diagram showing a fifth embodiment of the invention. While the transducer 10 is installed such that a longitudinal axis thereof lies in a vertical plane for scanning a vertical fan-shaped sounding area in the foregoing embodiments, the transducer 10 is installed such that the longitudinal axis thereof lies in a horizontal plane for scanning a horizontal fan-shaped sounding area in the fifth embodiment. This structure of a forward-looking sonar according to this embodiment is advantageous for detecting such navigational hazards as reefs or drifting surface objects ahead of the vessel. The embodiment may be modified such that the forward-looking sonar has two transducers, one installed in a vertical plane and the other installed in a horizontal plane. The forward-looking sonar of this modified form of the embodiment can simultaneously present a picture showing echoes in a vertical sounding area and a picture showing echoes in a horizontal sounding area.

Sixth Embodiment

Figure 23:
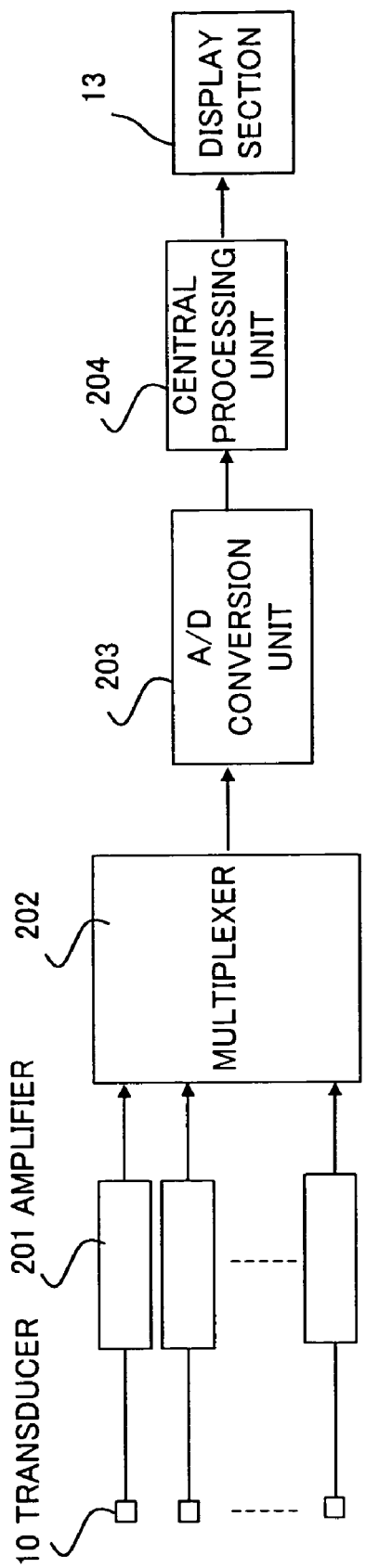
FIG. 23 is a diagram showing a sixth embodiment of the invention.

FIG. 23 is a diagram showing a sixth embodiment of the invention. A forward-looking sonar of this embodiment digitizes received echo signals and processes the digitized signals by software.

Signal processing in a receiver block can be performed by software-based operation by use of a central processing unit 204 (CPU) or a personal computer. In this embodiment, echo signals received by individual transducer elements are amplified up to a necessary amplitude level by an amplifier 201, sequentially sampled by a multiplexer 202 and digitized through an analog-to-digital (A/D) conversion unit 203. Subsequently, the digitized echo signals are subjected to processes of beamforming, phase difference measurement and amplitude measurement carried out by software-based mathematical operation and the results of such processing are presented on a display screen.

Seventh Embodiment

Figure 24:
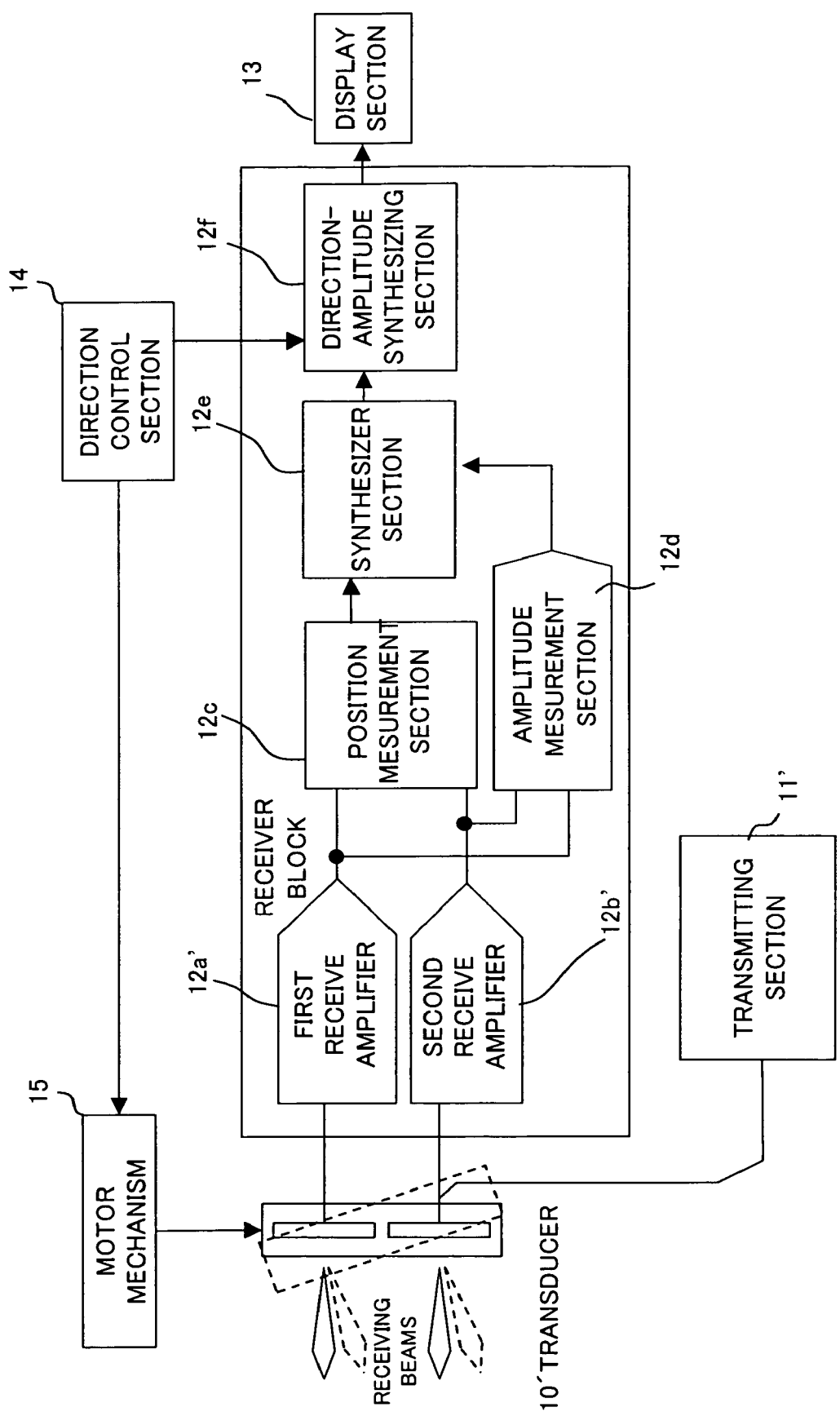
FIG. 24 is a block diagram of a forward-looking sonar according to a seventh embodiment of the invention.

FIG. 24 is a block diagram of a forward-looking sonar according to a seventh embodiment of the invention.

A major difference between the configuration of the forward-looking sonar of this embodiment and that of the first embodiment (FIG. 1) is that the forward-looking sonar of the seventh embodiment employs a transducer 10' made up of two transducer elements. The transducer 10' can be mechanically swung, or turned up and down, to steer a pair of receiving beams within a specific sector area in a vertical plane. Each of the two transducer elements can form a narrow receiving beam. Using these two receiving beams, a position measurement section 12c calculates the direction of a target by the split-beam method as well as the distance to the target from time needed for receiving an echo from the target after transmission. Alternatively, the position measurement section 12c calculates the distance to the target by the split-beam method and the direction of the target from the direction of an acoustic axis of a main beam obtained by adding the two receiving beams. In this embodiment, the forward-looking sonar determines the direction of or the distance to the target directly by the split-beam method, so that the beamforming sections 12a, 12b of FIG. 1 are not necessary and the forward-looking sonar includes receive amplifiers 12a', 12b' instead of the beamforming sections 12a, 12b. A transmitting beam may be formed by using one or both of the two transducer elements. A direction control section 14 controls the angular direction (tilt angle) of the transducer 10' and the direction of direction measurement. A motor mechanism 15 causes the transducer 10' to swing up and down. The forward-looking sonar thus configured can also prevent echo signal dropouts like the forward-looking sonar of FIG. 10.

Eighth Embodiment

Figure 25:
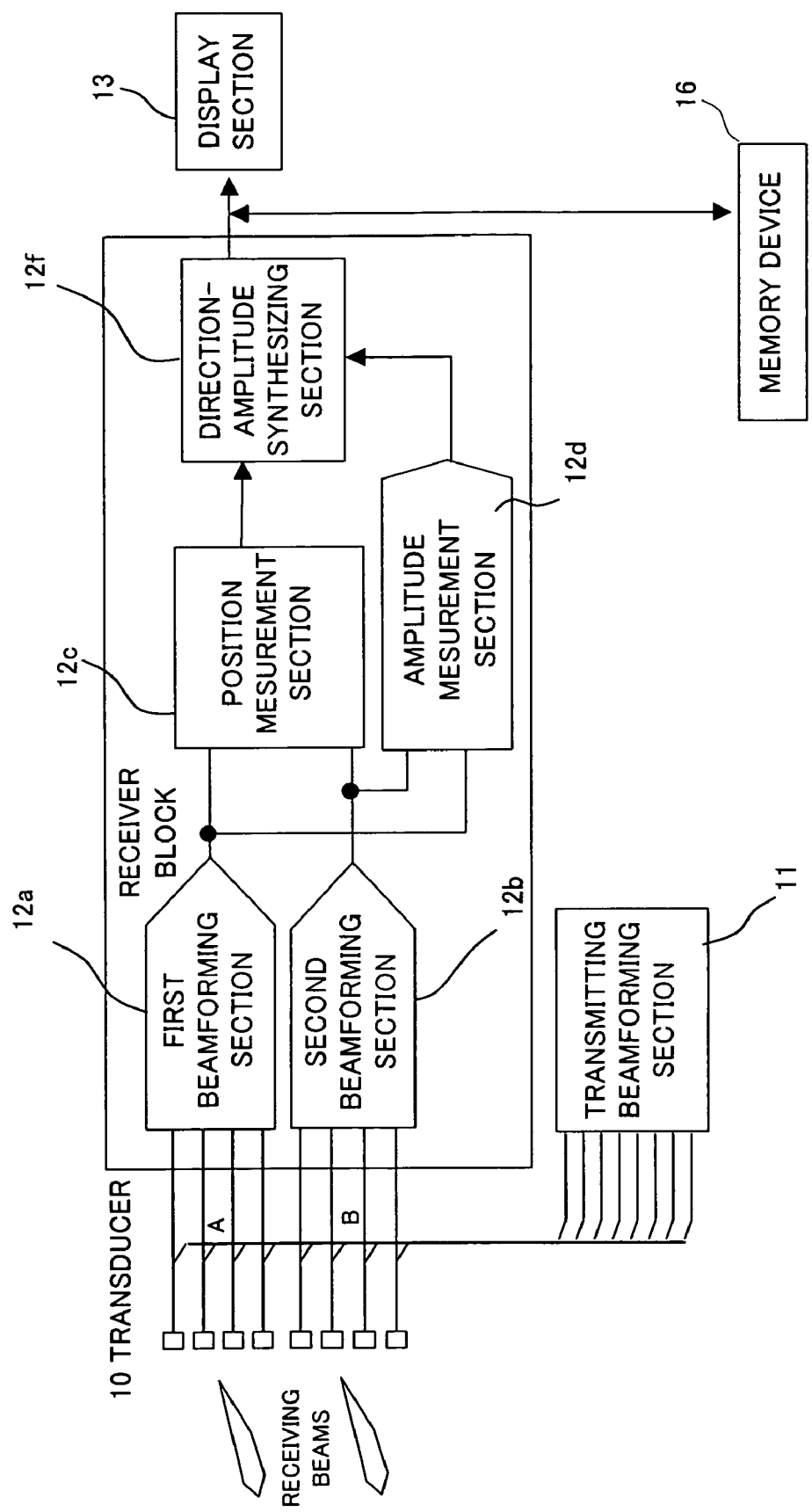
FIG. 25 is a block diagram of an underwater image display system according to an eighth embodiment of the invention.

FIG. 25 is a block diagram of an underwater image display system according to an eighth embodiment of the invention.

Figure 26:
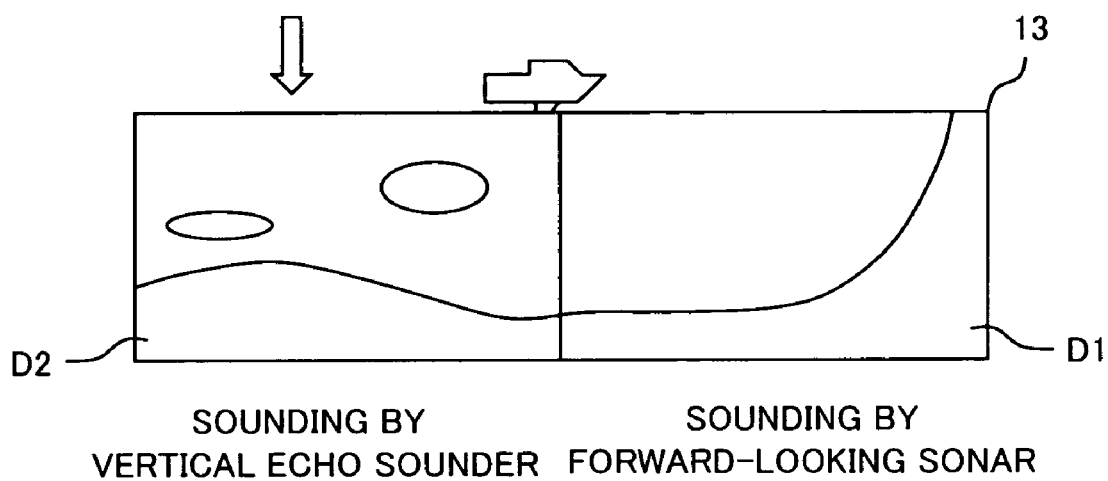
FIG. 26 is a diagram showing an example of on-screen display obtained by the eighth embodiment.
Figure 27:
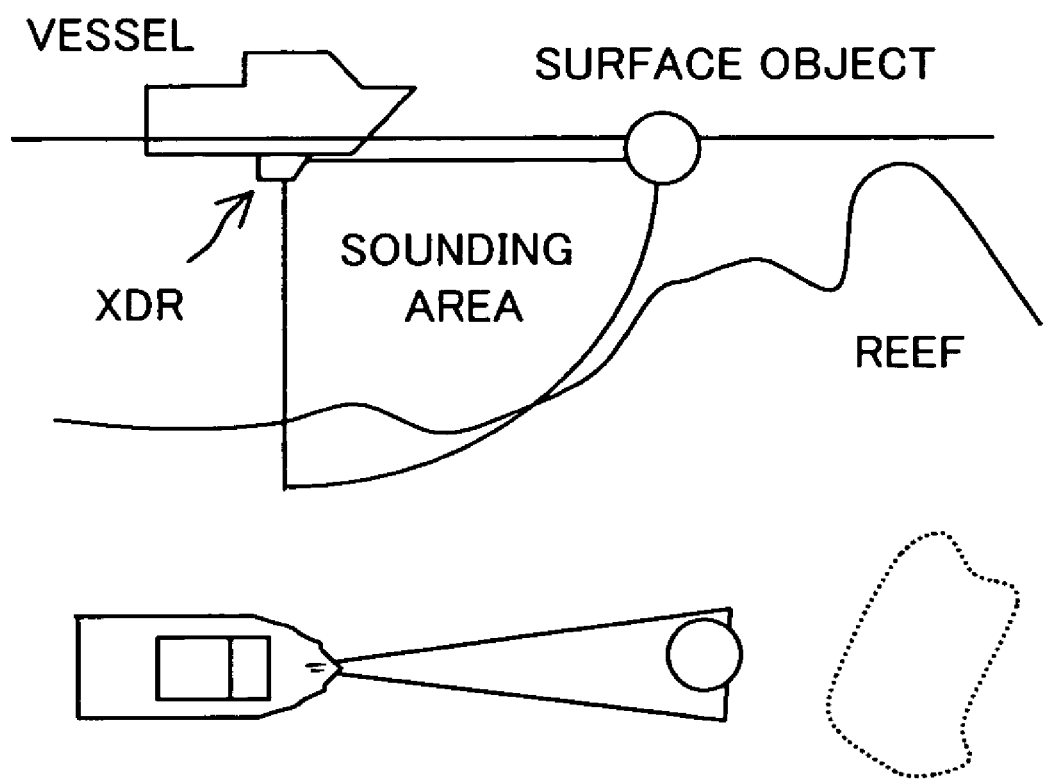
FIG. 27 is a diagram showing a sounding area of a conventional forward-looking sonar.
Figure 28:
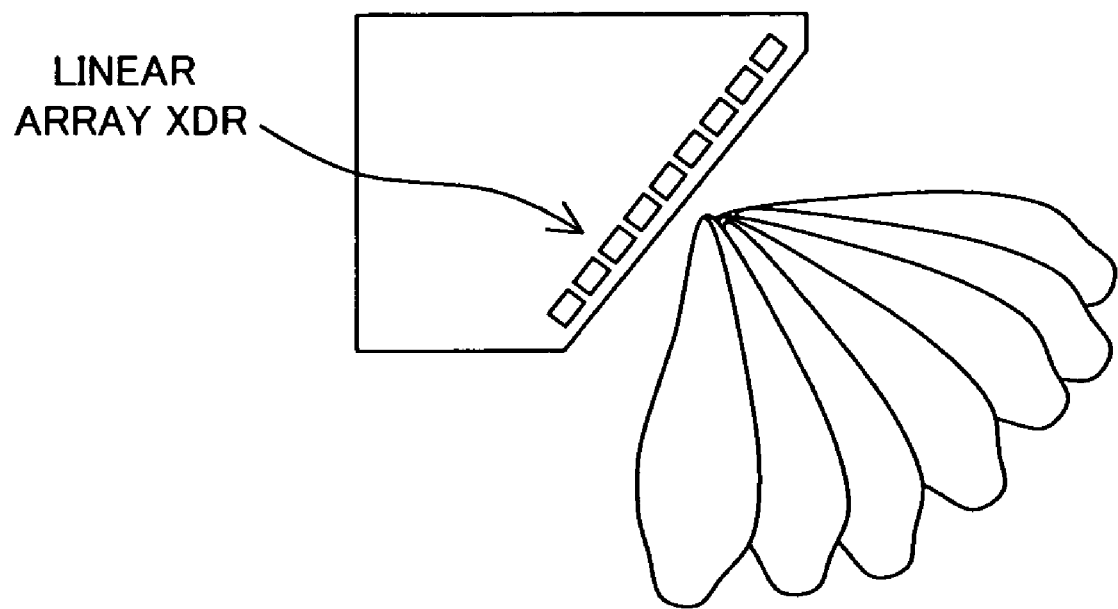
FIG. 28 is a diagram showing how an acoustic transmitting/receiving beam formed by a linear array transducer of the forward-looking sonar of FIG. 27 is successively steered.
Figure 29:
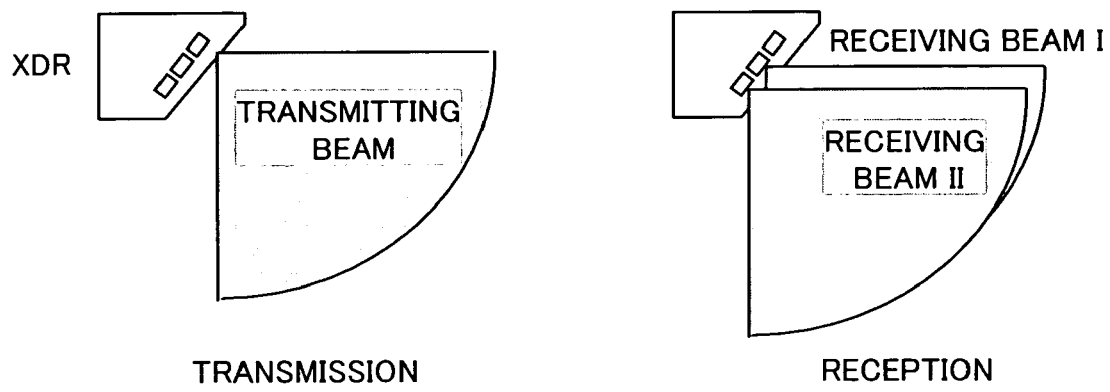
FIG. 29 is a diagram showing a transmitting beam and receiving beams formed by a conventional forward-looking sonar employing a split-beam method.

The underwater image display system including in itself a forward-looking sonar of the invention is provided with a memory device 16 for storing accumulated image data (sounding data) output to a display section 13. The display section 13 can present an image currently obtained by the forward-looking sonar or an image created from the sounding data stored in the memory device 16 selectively or both of these images together. FIG. 26 is a diagram showing an example of on-screen display obtained by the eighth embodiment, in which the display section 13 simultaneously shows an image D1 currently obtained by the forward-looking sonar and an image D2 created from the sounding data stored in the memory device 16. It will be recognized that the display example shown in FIG. 26 is a combination of a picture (image D1) obtained by a conventional echo sounder (which may be either a fish finder or a depth sounder) for displaying underwater situations immediately below and behind the vessel and a picture (image D2) obtained by the forward-looking sonar for displaying underwater situations ahead of the vessel.

While the forward-looking sonar of the invention determines echo signal intensities (amplitudes) with the main beam formed by adding two receiving beams as shown in FIG. 3 in the foregoing embodiments, the echo signal intensities (amplitudes) may be determined by using one of the two receiving beams. Generally, high echo signal intensities represent hard bottom areas while low echo signal intensities represent soft bottom areas. According to the invention, the echo signal intensities may be shown in different colors on-screen so that varying features of the sea bottom can be easily recognized in an intuitive fashion.

What is claimed is:

1. A forward-looking sonar comprising:
a transducer array formed of a plurality of transducer elements arranged in line, said transducer array being divided into a first sub array and a second sub array;
beamformers for forming a first receiving beam with said first sub array and a second receiving beam with said second sub array within a sounding area;
a position measurement section for determining the position of a target based on the direction of the target calculated from a phase difference between echoes from the target received by said first and second receiving beams within the sounding area and the distance to the target calculated from time needed for receiving the echoes after transmission; and
a synthesizing section for forming a main beam by adding said first and second receiving beams, calculating the center of gravity or a maximal value of echo signal intensities of an echo detected by said main beam along a range direction in each main beam direction, determining the position of the target from the direction of said main beam and the center of gravity or the maximal value of the echo signal intensities, and synthesizing the position of the target thus determined with the position of the target determined by said position section.

2. A forward-looking sonar comprising:
a transducer array formed of a plurality of transducer elements arranged in line, said transducer array being divided into a first sub array and a second sub array;
beamformers for forming a first receiving beam with said first sub array and a second receiving beam with said second sub array within a sounding area, said first and second receiving beams having a specific beam angle;
a position measurement section for determining the position of a target based on the direction of the target determined as being approximately at the middle of the beam angle of said first and second receiving beams when echoes from the target are received by said receiving beams within the sounding area and the distance to the target calculated from a phase difference between the echoes from the target picked up by said first and second receiving beams; and
a synthesizing section for forming a main beam by adding said first and second receiving beams, calculating the center of gravity or a maximal value of echo signal intensities of an echo detected by said main beam along a range direction in each main beam direction, determining the position of the target from the direction of said main beam and the center of gravity or the maximal value of the echo signal intensities, and synthesizing the position of the target thus determined with the position of the target determined by said position measurement section.

3. The forward-looking sonar according to claim 1 or 2, wherein said synthesizing section calculates the variance of the echo signal intensities along the range direction in each main beam direction, and synthesizes the position of the target determined by said synthesizing section from the direction of said main beam and the center of gravity or the maximal value of the echo signal intensities with the position of the target calculated by said position measurement section only when the variance of the echo signal intensities is equal to or lower than a specific threshold.

4. The forward-looking sonar according to claim 1 further comprising a synthesizing section for forming a main beam by adding said first and second receiving beams, calculating the center of gravity or a maximal value of echo signal intensities of an echo detected by said main beam along a beam steering direction at each distance, determining the position of the target from the distance to the target and the center of gravity or the maximal value of the echo signal intensities, and synthesizing the position of the target thus determined with the position of the target determined by said position measurement section.

5. A forward-looking sonar comprising:
a transducer array formed of a plurality of transducer elements arranged in line, said transducer array being divided into a first sub array and a second sub array;
beamformer for forming a first receiving beam with said first sub array and a second receiving beam with said second sub array within a sounding area;
a position measurement section for determining the position of a target based on the direction of the target calculated from a phase difference between echoes from the target received by said first and second receiving beams within the sounding area and the distance to the target calculated from time needed for receiving the echoes after transmission;
wherein said position measurement section expands the width of the direction of an echo determined based on the phase difference.

6. A forward-looking sonar comprising:
a transducer unit including a transducer for scanning a predetermined sounding area;
beamformers for forming a pair of receiving beam with said transducer unit and steering said receiving beams within the sounding area;
a position measurement section for determining the position of a target based on the direction of the target calculated from a phase difference between echoes from the target received by said tow receiving beams within the sounding area and the distance to the target calculated from time needed for receiving the echoes after transmission; and
a synthesizing section for forming a main beam by adding said first and second receiving beams, calculating the center of gravity or a maximal value of echo signal intensities of an echo detected by said main beam along a range direction in each main beam direction, determining the position of the target from the direction of said main beam and the center of gravity or the maximal value of the echo signal intensities, and synthesizing the position of the target thus determined with the position of the target determined by said position measurement section.

7. A forward-looking sonar comprising:
a transducer unit including a transducer for scanning a predetermined sounding area;
beamformers for forming a pair of receiving beams with said transducer unit and steering said receiving beams within the sounding area; and
a position measurement section for determining the position of a target based on the direction of the target calculated from a phase difference between echoes from the target received by said two receiving beams within the sounding area and the distance to the target calculated from time needed for receiving the echoes after transmission;
wherein said position measurement section expands the width of the direction of an echo determined based on the phase difference.

8. An underwater image display system comprising:

the forward-looking sonar according to claims 1, 2, 4, 5, 6, or 7;

a memory device for storing accumulated image data obtained by said forward-looking sonar; and a display for presenting an image obtained by said forward-looking sonar or an image created from the image data stored in said memory device selectively or both of these images together.

9. A forward-looking sonar comprising:

a transducer array formed of a plurality of transducer elements arranged vertically in line, said transducer array being divided into a first sub array and a second sub array;

a transmitting beamformer for forming a transmitting beam within a sounding area ahead of a vessel by supplying individual transducer elements with transmit signals;

receiving beamformers for forming a first receiving beam with said first sub array and a second receiving beam with said second sub array within the sounding area;

a position measurement section for determining the position of a target based on the direction of the target calculated from a phase difference between echoes from the target received by said first and second receiving beams within the sounding area and the distance to the target calculated from time needed for receiving the echoes after transmission;

a memory device for storing the position of a target obtained by said position measurement section, said target being under the vessel; and a display for displaying a present forward image based on the position of the target determined by said position measurement section and a historical downward image based on the position of the target stored in said memory device.

* * * * *